(12) United States Patent
Okada et al.

(10) Patent No.: US 11,338,242 B2
(45) Date of Patent: May 24, 2022

(54) METHOD AND APPARATUS FOR REMOVING CO2

(71) Applicants: Renaissance Energy Research Corporation, Kyoto (JP); JAPAN AEROSPACE EXPLORATION AGENCY, Tokyo (JP)

(72) Inventors: Osamu Okada, Kyoto (JP); Masaaki Teramoto, Kyoto (JP); Tamotsu Nonouchi, Kyoto (JP); Nobuaki Hanai, Kyoto (JP); Junya Miyata, Kyoto (JP); Yasato Kiyohara, Kyoto (JP); Masato Sakurai, Tokyo (JP); Shinichi Furukawa, Osaka (JP)

(73) Assignees: Renaissance Energy Research Corporation, Kyoto (JP); Japan Aerospace Exploration Agency, Tokyo (JP)

(\*) Notice: Subject to any disclaimer, the term of this patent is extended or adjusted under 35 U.S.C. 154(b) by 69 days.

(21) Appl. No.: 16/956,514

(22) PCT Filed: Dec. 27, 2017

(86) PCT No.: PCT/JP2017/046909
§ 371 (c)(1),
(2) Date: Jun. 19, 2020

(87) PCT Pub. No.: WO2019/130470
PCT Pub. Date: Jul. 4, 2019

(65) Prior Publication Data
US 2021/0008491 A1 Jan. 14, 2021

(51) Int. Cl.
*B01D 53/22* (2006.01)
*B01D 69/02* (2006.01)
*B01D 71/60* (2006.01)

(52) U.S. Cl.
CPC ........... *B01D 53/228* (2013.01); *B01D 69/02* (2013.01); *B01D 71/60* (2013.01); *B01D 2053/221* (2013.01); *B01D 2325/36* (2013.01)

(58) Field of Classification Search
CPC .............. B01D 2053/221; B01D 71/60; B01D 53/228; B01D 69/02; B01D 2325/36
See application file for complete search history.

(56) References Cited

U.S. PATENT DOCUMENTS

| 4,268,279 | A | * | 5/1981 | Shindo | ................. | B01D 53/228 |
| | | | | | | 210/321.8 |
| 2002/0156081 | A1 | * | 10/2002 | Hirst | ......................... | A61P 3/10 |
| | | | | | | 514/247 |

(Continued)

FOREIGN PATENT DOCUMENTS

| EP | 2742993 A1 | 6/2014 |
| JP | 7-112122 A | 5/1995 |

(Continued)

OTHER PUBLICATIONS

Yegani et al: "Selective separation of CO2 by using novel facilitated transport membrane at elevated temperatures and pressures", Journal of Membrane Science, Elsevier BV, NL, vol. 291, No. 1-2, Mar. 1, 2007 (Mar. 1, 2007), pp. 157-164, XP005908883.

(Continued)

*Primary Examiner* — Anthony R Shumate
(74) *Attorney, Agent, or Firm* — Haynes Beffel & Wolfeld LLP; Andrew Dunlap

(57) ABSTRACT

Provided is a method for removing $CO_2$ comprising: supplying a gas to be processed containing $CO_2$, $N_2$ and $O_2$ to a feed side of a $CO_2/O_2$ selective permeation membrane within a temperature range of 15° C. to 50° C.; generating water vapor and supplying the water vapor to the $CO_2/O_2$ selective permeation membrane; selectively removing $CO_2$ from the gas to be processed by permeating $CO_2$ in the gas (Continued)

to be processed from the feed side to a permeate side of the $CO_2$ selective permeation membrane selectively to $O_2$ and $N_2$ in the gas to be processed; and using a $CO_2$ facilitated transport membrane having $CO_2/O_2$ selectivity and $CO_2/N_2$ selectivity within the temperature range as the $CO_2$ selective permeation membrane, the $CO_2$ facilitated transport membrane being configured with a hydrophilic polymer containing an amino acid and a deprotonating agent for preventing protonation of an amino group of the amino acid supported by a porous membrane, wherein a $CO_2$ concentration in the gas to be processed is 3 mol % or less on a dry basis.

17 Claims, 18 Drawing Sheets

(56) References Cited

U.S. PATENT DOCUMENTS

| | | | |
|---|---|---|---|
| 2009/0290100 A1* | 11/2009 | Haruta | G02B 5/3083 349/75 |
| 2010/0108607 A1* | 5/2010 | Yeager | C08L 81/06 210/654 |
| 2011/0052466 A1 | 3/2011 | Liu | |
| 2014/0345456 A1* | 11/2014 | Sano | B01D 67/0006 95/51 |
| 2014/0352540 A1 | 12/2014 | Okada et al. | |
| 2014/0360938 A1* | 12/2014 | Hayashi | B01D 69/125 210/638 |
| 2015/0122727 A1* | 5/2015 | Karnik | C23C 16/45555 210/500.21 |
| 2015/0165390 A1* | 6/2015 | Hiranabe | B01D 69/02 95/55 |
| 2015/0209776 A1* | 7/2015 | Gin | C08F 8/30 95/51 |
| 2015/0376208 A1* | 12/2015 | Alexander | C07D 487/04 514/220 |
| 2017/0056839 A1* | 3/2017 | Ho | B01D 71/32 |
| 2018/0340049 A1* | 11/2018 | Sadik | G01N 33/02 |
| 2019/0233296 A1* | 8/2019 | Novek | C01C 1/26 |

FOREIGN PATENT DOCUMENTS

| | | |
|---|---|---|
| JP | 2000229219 A | 8/2000 |
| JP | 201349048 A | 3/2013 |
| WO | 2016196056 A1 | 12/2016 |

OTHER PUBLICATIONS

EP17936731—Extended European Search Report dated Apr. 21, 2021, 8 pgs.
Robeson, "The upper bound revisited," Journal of Membrane Science 320, Jul. 15, 2008, 11 pages.

* cited by examiner

Evaluation 1

| Sample | Polymer | $CO_2$ carrier | Deprotonating agent | Ionic liquid | Gel-weight (mg/cm$^2$) | $KCO_2$(mol m$^{-2}$ s$^{-1}$ kPa$^{-1}$) | $KO_2$(mol m$^{-2}$ s$^{-1}$ kPa$^{-1}$) | $\alpha(CO_2/O_2)$ |
|---|---|---|---|---|---|---|---|---|
| #1 | PVA/PAA(Cs) | Glycine | CsOH | none | 25 | 2.46E-05 | 5.19E-09 | 5331 |
| #2 | PVA/PAA(Cs) | CsOH | — | none | 25 | 3.73E-06 | 6.61E-09 | 520 |

Fig. 3

Evaluation 3

| Sample | Polymer | CO₂ carrier | Deprotonating agent | Ionic liquid | Gel-weight (mg/cm²) | $KCO_2$ (mol m⁻² s⁻¹ kPa⁻¹) | $KO_2$ (mol m⁻² s⁻¹ kPa⁻¹) | α(CO₂/O₂) |
|---|---|---|---|---|---|---|---|---|
| #8 | PVA/PAA(Cs) | Glycine | CsOH | [EMIM][Cl] | 25 | 1.70E-05 | 7.41E-09 | 2400 |
| #9 | PVA/PAA(Cs) | Glycine | CsOH | [P4444][Gly] | 25 | 1.25E-05 | 5.19E-09 | 2755 |
| #10 | PVA/PAA(Cs) | Glycine | CsOH | [EMIM][Tf2N] | 25 | 1.37E-05 | 7.16E-09 | 1949 |
| #11 | PVA/PAA(Cs) | Glycine | CsOH | [P4444][Pro] | 25 | 1.44E-05 | 7.69E-09 | 1866 |

Fig. 10

Evaluation 8

| Sample | Polymer | $CO_2$ carrier | Deprotonating agent | Ionic liquid | Gel-weight (mg/cm$^2$) | $KCO_2$ (mol m$^{-2}$ s$^{-1}$ kPa$^{-1}$) | $KN_2$ (mol m$^{-2}$ s$^{-1}$ kPa$^{-1}$) | $\alpha(CO_2/N_2)$ |
|---|---|---|---|---|---|---|---|---|
| #16 | PVA/PAA(Cs) | Glycine | CsOH | none | 25 | 3.89E-05 | 6.93E-09 | 5610 |
| #17 | PVA/PAA(Cs) | Glycine | CsOH | [N1111][Gly] | 25 | 4.29E-05 | 3.84E-09 | 11200 |

Fig. 17

METHOD AND APPARATUS FOR REMOVING CO2

TECHNICAL FIELD

The present invention relates to a method and an apparatus for removing $CO_2$ from a gas to be processed containing $N_2$, $O_2$ and a trace of $CO_2$ selectively to $N_2$ and $O_2$ to reduce the carbon dioxide concentration in the gas to be processed, and, in particular, to a method and an apparatus for removing $CO_2$ to selectively reduce the carbon dioxide concentration while suppressing the decrease of the oxygen concentration in a human residential space.

BACKGROUND ART

Regarding the effect of carbon dioxide concentration on the human body, according to data provided by the Tokyo Fire Department, for example, it has been reported that the concentration is 360 ppm in the atmospheric air, the allowable concentration is 5000 ppm for occupational hygiene standard based on 8-hour work per day, the concentration in which ventilation needs to be increased by 50% is 1.8%, the concentration in which respiratory distress occurs, headache, nausea, and weak anesthesia are accompanied, vision is decreased, and blood pressure and pulse are increased is 3%, the concentration in which ventilation needs to be increased by 300% and headache is intensified is 4%, etc. In the recommendation of the Japan Society of Industrial Hygiene (FY 2015), the carbon dioxide concentration is 5000 ppm, and the carbon dioxide concentration exceeding 5000 ppm is known to have serious effects on the human body.

Incidentally, in a general building in which a person can reside with the atmosphere, it is easy to control the carbon dioxide concentration in the residential space within a predetermined suitable range by ventilating. However, in the case where the residential space subject to the carbon dioxide concentration control is an enclosed space which is difficult to ventilate to and from the outside air, such as a space station provided outside the atmosphere, a space suit used in the outer space, or a submarine navigating underwater, it is necessary to control the increase of the carbon dioxide concentration in the space by selectively removing carbon dioxide while suppressing the loss of oxygen necessary for maintaining human life.

In order to control the carbon dioxide concentration in the space field, an adsorption method for adsorbing and removing carbon dioxide on a porous adsorbent is generally employed. As a method for removing carbon dioxide other than the adsorption method, there is a membrane separation method using a $CO_2$ facilitated transport membrane (for example, see Patent Documents 1 and 2 below). In the membrane separation method, carbon dioxide in the gas to be processed is removed by permeation from the feed side of the membrane to the permeate side by the facilitated transport mechanism, and dissolution of carbon dioxide into the membrane and release of carbon dioxide on the permeate side occur simultaneously and continuously. Therefore, unlike the adsorption method, the membrane is not a place where carbon dioxide is accumulated but a place where carbon dioxide is permeated, and the membrane separation method is superior to the adsorption method, which repeats adsorption and regeneration, in that it has no capacity limit. In addition, the membrane separation method using $CO_2$ facilitated transport membrane may consume less energy as compared with the adsorption method requiring regeneration treatment of the adsorbent by heat treatment or the like.

$CO_2$ facilitated transport membrane is configured by incorporating a carrier which reversibly and selectively reacts with carbon dioxide into the membrane. Carbon dioxide mainly permeates through the membrane as a reaction product with the carrier (chemical dissolution and diffusion mechanism (facilitated transport mechanism)), and nitrogen, oxygen, etc. which do not react with the carrier permeate through the membrane by a physical dissolution and diffusion mechanism, so that the permeance of carbon dioxide is larger than the permeance of nitrogen, oxygen, etc. which do not react with the carrier, and it is expected that very high selectivity is exhibited. As for $CO_2/N_2$ selectivity, various compounds have been evaluated as a $CO_2$ carrier (see, for example, Patent Documents 1 and 2, etc. below). Incidentally, as for the gas permeance, $(mol \cdot m^{-2} \cdot s^{-1} \cdot kPa^{-1})$ is generally used as a unit, and this unit is also used in this specification.

PRIOR ART DOCUMENTS

Patent Documents

Patent Document 1: Japanese Patent Application Publication No. 2000-229219
Patent Document 2: Japanese Patent Application Publication No. H07-112122

Non-Patent Documents

Non-patent Document 1: L. M. Robeson, "The upper bound revisited", Journal of Membrane Science 320 (2008) 390-400

SUMMARY OF THE INVENTION

Problems to be Solved by the Invention

As described above, under the assumption of carbon dioxide concentration control for human residential spaces, a high degree of selectivity is required not only for $CO_2/N_2$ selectivity but also for $CO_2/O_2$ selectivity, because it is necessary to suppress the oxygen loss. It is also assumed that the carbon dioxide concentration in the gas to be processed containing $N_2$, $O_2$ and $CO_2$, which is the target of the carbon dioxide concentration control, is a concentration at which a person can exist normally to some extent even prior to the control. The carbon dioxide concentration in the gas to be processed used for evaluating $CO_2/N_2$ selectivity in the above-mentioned Patent Documents 1 and 2 is 10 mol %, and is extremely high as the carbon dioxide concentration in the human residential space, which can cause death of the person.

In addition, as disclosed in FIG. 1 of the above-mentioned non-patent document 1, it is apparent that $O_2/N_2$ selectivity changes greatly in the range of about 1 to 20 depending on the permeability of $O_2$, rather than the type of the membrane (many evaluation conditions), and that $O_2$ permeance is larger than $N_2$ permeance. However, it is shown that $CO_2/O_2$ selectivity cannot be easily inferred from $CO_2/N_2$ selectivity. Furthermore, there has not yet been an example of evaluating what carrier is effective as a $CO_2$ carrier capable of exhibiting a high $CO_2/O_2$ selectivity for the gas to be processed having the carbon dioxide concentration at which human can be normally present to some extent (e.g., 2 mol % or less) or the carbon dioxide concentration in which serious effect on the human body gradually becomes noticeable (e.g., 2 to 5 mol %). Incidentally, the gas permeability is an index showing the permeation rate of the gas, and corresponds to the gas permeance multiplied by the membrane thickness. Barrer is generally used as a unit of the permeability.

The present invention has been made in view of the above-described problems, and an object is to provide a method and an apparatus for removing $CO_2$ to remove $CO_2$ from the gas to be processed, which includes $N_2$, $O_2$ and a trace of $CO_2$ less than or equal to 3 mol %, preferably less than or equal to 2 mol %, selectively to $N_2$ and $O_2$, and to reduce the carbon dioxide concentration in the gas to be processed.

Means for Solving the Problem

The inventors of the present application have intensively studied and found that high $CO_2/O_2$ selectivity can be obtained by using, as a $CO_2$ selective permeation membrane for use in a membrane separation method in an enclosed residential space such as a space station, a $CO_2$ facilitated transport membrane in which a hydrophilic polymer containing an amino acid and a deprotonating agent for preventing protonation of an amino group of the amino acid is supported on a porous membrane by using an amino acid as a carrier for a gas to be processed having a $CO_2$ concentration of 3 mol % or less in a temperature range of about room temperature, and have reached the present invention as described below.

In order to achieve the above object, the present invention provides a method for removing $CO_2$ comprising: supplying a gas to be processed including $CO_2$, $N_2$ and $O_2$ to a feed side of a $CO_2$ selective permeation membrane; generating water vapor and supplying the water vapor to the $CO_2$ selective permeation membrane; selectively removing $CO_2$ from the gas to be processed by permeating $CO_2$ in the gas to be processed from the feed side to a permeate side of the $CO_2$ selective permeation membrane selectively to $O_2$ and $N_2$ in the gas to be processed; and using a $CO_2$ facilitated transport membrane having $CO_2/O_2$ selectivity and $CO_2/N_2$ selectivity as the $CO_2$ selective permeation membrane, the $CO_2$ facilitated transport membrane being configured to have a hydrophilic polymer layer containing an amino acid and a deprotonating agent for preventing protonation of an amino group of the amino acid, and a porous membrane supporting the hydrophilic polymer layer, wherein a $CO_2$ concentration of the gas to be processed is 3 mol % or less on a dry basis.

In the method for removing $CO_2$ having the characteristic described above, it is preferable that the $CO_2$ facilitated transport membrane has $CO_2/O_2$ selectivity and $CO_2/N_2$ selectivity within a temperature range of 15° C. to 50° C., and the gas to be processed is supplied to the feed side of the $CO_2$ selective permeation membrane within the temperature range.

In the method for removing $CO_2$ having the characteristic described above, it is preferable to reduce a permeate side pressure of the $CO_2$ selective permeation membrane to 1 kPa or more and less than a saturated water vapor pressure at an atmosphere temperature of the $CO_2$ selective permeation membrane to be lower than a feed side pressure of the $CO_2$ selective permeation membrane.

In the method for removing $CO_2$ having the characteristic described above, it is preferable that the amino acid is at least one selected from glycine, 2, 3-diaminopropionic acid, alanine, arginine, asparagine, serine, ornithine, creatine, threonine, and 2-aminobutyric acid.

In the method for removing $CO_2$ having the characteristic described above, it is preferable that a weight of the hydrophilic polymer layer containing the amino acid and the deprotonating agent per unit area of the $CO_2$ facilitated transport membrane is equal to or more than 1 $mg/cm^2$ and equal to or less than 100 $mg/cm^2$.

In the method for removing $CO_2$ having the characteristic described above, it is preferable that a relative humidity on the feed side of the $CO_2$ selective permeation membrane is 50% or more and 100% or less.

In the method for removing $CO_2$ having the characteristic described above, it is preferable that a relative humidity on the permeate side of the $CO_2$ selective permeation membrane is 50% or more and 100% or less.

In the method for removing $CO_2$ having the characteristic described above, the $CO_2$ selective permeation membrane may further comprise an ionic liquid in the hydrophilic polymer layer. In this case, it is preferable that the ionic liquid is an amino acid ionic liquid having an amino group. Further, a molecular weight of the ionic liquid is preferably 1000 or less, more preferably 500 or less, and still more preferably 200 or less. Further, a content of the ionic liquid is preferable 30 wt % or less, more preferably 20 wt % or less, and still more preferably 10 wt % or less, based on a total weight of the hydrophilic polymer, the amino acid, and the deprotonating agent contained in the hydrophilic polymer layer.

In order to achieve the above object, the present invention provides an apparatus for removing $CO_2$ that removes $CO_2$ in a gas to be processed including $CO_2$, $N_2$ and $O_2$ selectively to $O_2$ and $N_2$ in the gas to be processed. The apparatus comprises a $CO_2$ facilitated transport membrane having $CO_2/O_2$ selectivity and $CO_2/N_2$ selectivity, and a water vapor generator that generates water vapor and supplies the water vapor to the $CO_2$ facilitated transport membrane, wherein the $CO_2$ facilitated transport membrane is configured to have a hydrophilic polymer layer containing an amino acid, a deprotonating agent for preventing protonation of an amino group of the amino acid, and an amino acid ionic liquid having an amino group, and a porous membrane supporting the hydrophilic polymer layer.

In the apparatus for removing $CO_2$ having the characteristic described above, it is preferable that the $CO_2$ facilitated transport membrane has $CO_2/O_2$ selectivity and $CO_2/N_2$ selectivity within a temperature range of 15° C. to 50° C.

In the apparatus for removing $CO_2$ having the characteristic described above, it is preferable that the amino acid is at least one selected from glycine, 2, 3-diaminopropionic acid, alanine, arginine, asparagine, serine, ornithine, creatine, threonine, and 2-aminobutyric acid.

In the apparatus for removing $CO_2$ having the characteristic described above, it is preferable that the amino acid ionic liquid is a chemical substance selected from compounds consisting of a combination of an anion of amino acid ions and a cation of ammonium ions, phosphonium ions, or imidazolium ions.

In the apparatus for removing $CO_2$ having the characteristic described above, it is preferable that a weight of the hydrophilic polymer layer containing the amino acid, the deprotonating agent, and the amino acid ionic liquid per unit area of the $CO_2$ facilitated transport membrane is equal to or more than 1 $mg/cm^2$ and equal to or less than 100 $mg/cm^2$.

In the apparatus for removing $CO_2$ having the characteristic described above, a molecular weight of the ionic liquid is preferably 1000 or less, more preferably 500 or less, and still more preferably 200 or less. Further, a content of the ionic liquid is preferably 30 wt % or less, more preferably 20 wt % or less, and still more preferably 10 wt % or less, based on a total weight of the hydrophilic polymer, the amino acid, and the deprotonating agent contained in the hydrophilic polymer layer.

It is preferable that the apparatus for removing $CO_2$ having the characteristic described above includes a pressure regulator for regulating a permeate side pressure of the $CO_2$ selective permeation membrane to be 1 kPa or more and less than a saturated water vapor pressure at an atmosphere temperature of the $CO_2$ selective permeation membrane.

Effect of the Invention

According to the method and the apparatus for removing $CO_2$ described above, $CO_2$ can be removed from the gas to be processed including $N_2$, $O_2$ and a trace amount of $CO_2$ not exceeding 3 mol %, selectively to $N_2$ and $O_2$, to reduce the carbon dioxide concentration in the gas to be processed while suppressing the $O_2$ loss.

BRIEF DESCRIPTION OF THE DRAWINGS

FIG. 3 is a table of the measurement results of the membrane performances ($CO_2$ permeance, $O_2$ permeance, $CO_2/O_2$ selectivity) of the $CO_2$ facilitated transport membrane (Samples #1 and #2).

FIG. 10 is a table showing the measurement results of the membrane performances ($CO_2$ permeance, $O_2$ permeance, $CO_2/O_2$ selectivity) of the $CO_2$ facilitated transport membrane (Samples #8 to #11).

FIG. 17 is a table showing the measurement results of the membrane performances ($CO_2$ permeance, $N_2$ permeance, and $CO_2/N_2$ selectivity) of the $CO_2$ facilitated transport membrane (Samples #16 and #17).

DESCRIPTION OF EMBODIMENT

Figure 1:
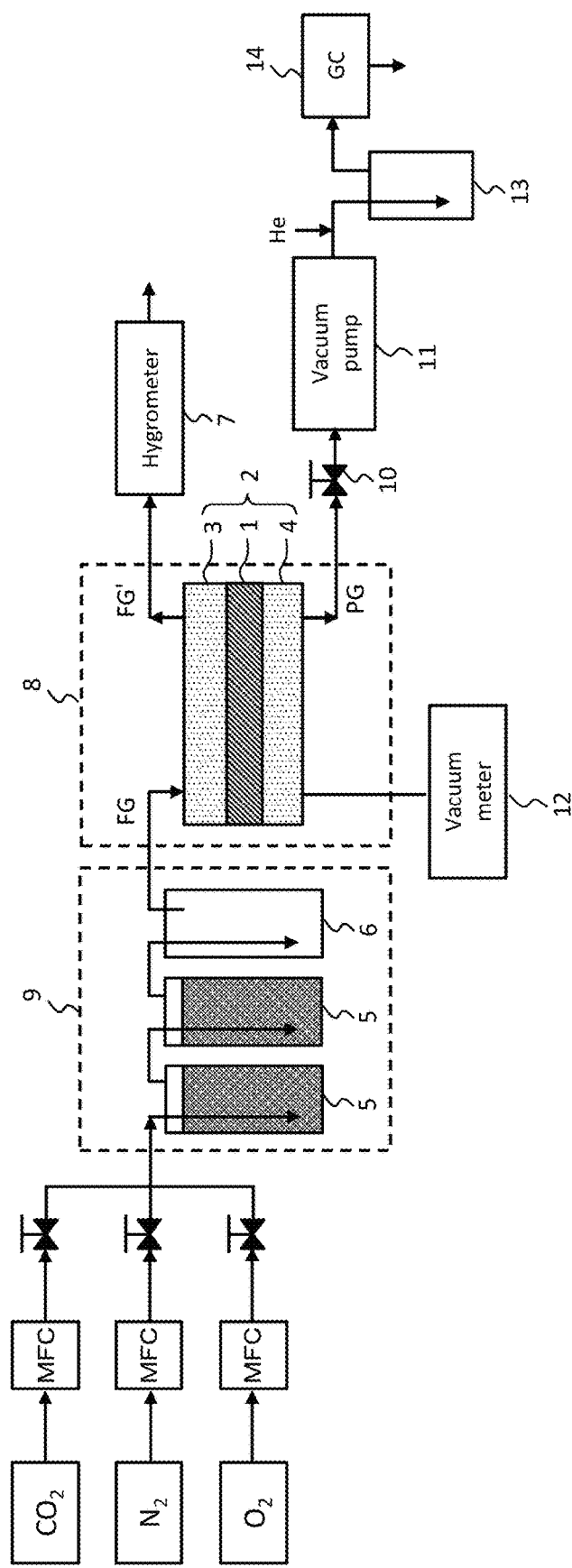
FIG. 1 is a block diagram showing an experimental apparatus for evaluating the membrane performances of the $CO_2$ facilitated transport membrane by a decompression method.

Embodiments of the method for removing $CO_2$ (hereinafter referred to as the "present method" as appropriate) and the apparatus for removing $CO_2$ (hereinafter referred to as the "present apparatus" as appropriate) according to the present invention will be described with reference to the drawings.

The present method is to selectively remove $CO_2$ from the gas to be processed, including $CO_2$, $N_2$ and $O_2$, using a $CO_2$ selective permeation membrane. In the present method, the processing temperature range for the gas to be processed is set to be 15° C. or more, and 50° C. or less, preferably 40° C. or less, more preferably 35° C. or less, still more preferably 30° C. or less, and the $CO_2$ concentration of the gas to be processed is set to be more than 0 mol % and 3 mol % or less, preferably 2 mol % or less, more preferably 1 mol % or less, on a dry basis, in order to be adaptable to the carbon dioxide concentration control in a human residential space, in particular, in an enclosed residential space. The above lower and upper limits for the $CO_2$ concentration in the present method and the present apparatus do not specify critical conditions for the membrane performances of the $CO_2$ selective permeation membrane, but show allowable limits of the $CO_2$ concentration before the present method is applied, as a $CO_2$ concentration in a human residential space, assuming that the $CO_2$ concentration is reduced to the extent that people can live normally by the present method and the present apparatus. That is, the present method and the present apparatus, unlike conventional method and apparatus for removing $CO_2$ for industrial use, the $CO_2$ concentration of the gas to be processed is set low.

As described above, since the present method assumes adaptation to human residential space, an amount of $O_2$ loss due to $CO_2$ removal process must be kept extremely low. Therefore, the present method uses a $CO_2$ facilitated transport membrane comprising a gelled hydrophilic polymer containing an amino acid and a deprotonating agent for preventing protonation of an amino group of the amino acid, which can exhibit high $CO_2/O_2$ selectivity for the above mentioned processing temperature range and the gas to be processed of the above mentioned $CO_2$ concentration, as the $CO_2$ selective permeation membrane. The hydrophilic polymer is supported on a porous membrane to form a membranal hydrophilic polymer layer.

In addition, in the present method, it is preferable to generate a $CO_2$ partial pressure difference between the feed side and the permeate side of the $CO_2$ facilitated transport membrane by reducing the permeate side pressure of the $CO_2$ facilitated transport membrane to 1 kPa or more and less than a saturated water vapor pressure at the atmospheric temperature of the permeate side of the $CO_2$ facilitated transport membrane to be lower than the feed side pressure, and remove $CO_2$ in the gas to be processed by selectively passing it to the permeate side of the $CO_2$ facilitated transport membrane. When the feed side pressure of the $CO_2$ facilitated transport membrane is the atmospheric pressure, the lower the permeate side pressure within the above pressure range, the more the $CO_2$ partial pressure difference which becomes the driving force for $CO_2$ permeation from the feed side of the membrane to the permeate side is secured. On the other hand, the higher the permeate side pressure, the higher the relative humidity of the permeation side, as described later, and the moisture content in the membrane required for reacting $CO_2$ with the amino acid can be secured. In other words, if the permeate side pressure is within the above mentioned pressure range, it is possible to ensure $CO_2$ partial pressure difference, which is the driving force for $CO_2$ permeation from the feed side of the membrane to the permeate side, while ensuring the moisture content in the membrane needed required for the reaction of $CO_2$ and the amino acid. The feed side pressure of $CO_2$ facilitated transport membrane is not limited to the atmospheric pressure, and may be lower or higher than the atmospheric pressure as long as the feed side pressure is higher than the permeate side pressure.

Alternatively, instead of the decompression method in which the permeate side pressure of $CO_2$ facilitated transport membrane is reduced to be lower than the feed side pressure, a sweep gas method, in which the feed side pressure and the permeate side pressure of the $CO_2$ facilitated transport membrane is made equal and the sweep gas is supplied to the permeate side, can be used to generate a $CO_2$ partial pressure difference between the feed side and the permeate side of the $CO_2$ facilitated transport membrane and to remove $CO_2$ in the gas to be processed by selectively passing it to the permeate side. Alternatively, the decompression method and the sweep gas method may be combined.

The amino acid used in the $CO_2$ facilitated transport membrane functions as the carrier that selectively reacts with $CO_2$ in the chemical dissolution and diffusion mechanism. In the chemical dissolution and diffusion mechanism, the moisture content is required for the reaction between $CO_2$ and the carrier. Specifically, the reaction between carbon dioxide ($CO_2$) and primary amines ($RNH_2$) in the membrane usually repeats the reactions shown in reaction pathway formulas (Chemical Equation 1) below, and exhibits the chemical reaction shown in overall reaction formula (Chemical Equation 2) as a whole. It can be seen that the higher the moisture content in the membrane, the more the chemical equilibrium shifts to the product side (right side) and the better the permeation of carbon dioxide is facilitated.

$$CO_2 + 2RNH_2 \rightarrow RNHCOO^- + RNH_3^+$$

$$RNHCOO^- + H_2O \rightarrow RNH_2 + HCO_3^- \quad \text{(Chemical Equation 1)}$$

$$CO_2 + RNH_2 + H_2O \rightarrow HCO_3^- + RNH_3^+ \quad \text{(Chemical Equation 2)}$$

Accordingly, in the present method, while the gas to be processed is supplied to the feed side of the $CO_2$ facilitated transport membrane, the water vapor is generated to supply to the $CO_2$ facilitated transport membrane. As a result, $CO_2$ in the gas to be processed reacts with the carrier in the membrane, and the chemical dissolution and diffusion mechanism allows it to pass from the feed side of the $CO_2$ facilitated transport membrane to the permeate side, and the physical dissolution and diffusion mechanism allows $O_2$ and $N_2$ in the gas to be processed to pass from the feed side of the $CO_2$ facilitated transport membrane to the permeate side. As described later, since $CO_2$ permeance by the chemical dissolution and diffusion mechanism is greater than $O_2$ permeance and $N_2$ permeance by the physical dissolution and diffusion mechanism, $CO_2$ in the gas to be processed permeates selectively to $O_2$ and $N_2$ through the $CO_2$ facilitated transport membrane and is selectively removed from the gas to be processed.

As amino acids functioning as the $CO_2$ carrier, glycine, 2,3-diaminopropionic acid (DAPA), alanine, arginine, asparagine, serine, ornithine, creatine, threonine, 2-aminobutyric acid, and the like can be suitably used.

When the amino acid is dissolved in water, the amino group ($NH_2$) is protonated and dissociated into $NH_3^+$, but as shown in (Chemical Equation 2) above, carbon dioxide does not react with the protonated amino group ($NH_3^+$) but reacts with the free amino group ($NH_2$). Therefore, by adding base equivalent to or more than the amino acid, all $NH_3^+$ can be converted to $NH_2$, maximizing the function as the $CO_2$ carrier of the amino acid. The base is only required to be strongly basic enough to remove a proton from protonated $NH_3^+$ and convert it into $NH_2$, and a hydroxide or carbonate of an alkali metal element such as CsOH can be suitably used.

When an equivalent amount or more of base is added, the excess base reacts with carbon dioxide, and, for example, when CsOH is used, carbonate is produced as shown in (Chemical Equation 3) below. In this case, the carbonate functions as a $CO_2$ carrier together with the amino acid (see Patent Document 2).

$$CO_2 + CsOH \rightarrow CsHCO_3$$

$$CsHCO_3 + CsOH \rightarrow Cs_2CO_3 + H_2O \quad \text{(Chemical Equation 3)}$$

From the above (Chemical Equation 3), for example, when either cesium hydroxide (CsOH) or cesium carbonate ($Cs_2CO$) is used as the deprotonating agent, if the final pH values are the same, these are equivalent. Likewise, lithium hydroxide and lithium carbonate, sodium hydroxide and sodium carbonate, potassium hydroxide and potassium carbonate, rubidium hydroxide and rubidium carbonate are in the equivalent relationship, respectively.

As the hydrophilic polymer constituting the $CO_2$ facilitated transport membrane, for example, polyvinyl alcohol-polyacrylic acid (PVA/PAA) salt copolymer, polyvinyl alcohol (PVA), polyacrylic acid (PAA), chitosan, polyvinylamine, polyallylamine, polyvinylpyrrolidone, and the like can be used, but are not necessarily limited thereto. In addition, the hydrophilic polymer layer may be a hydrogel layer part or all of which is hydrogel. The hydrogel has a three-dimensional network structure formed by crosslinking a hydrophilic polymer. The hydrogel often has the property of swelling by absorbing water. The degree of cross-linking of the hydrogel when the hydrophilic polymer is the PVA/PAA salt copolymer or the polyvinyl alcohol can be adjusted by additive amount of a cross-linking agent such as a dialdehyde compound such as glutaraldehyde, an aldehyde compound such as formaldehyde, or the like. PVA/PAA salt copolymer is sometimes referred to as a PVA/PAA copolymer by those skilled in the art.

The porous membrane supporting the hydrophilic polymer layer preferably has mechanical strength and adhesion to the hydrophilic polymer layer, and further preferably has a porosity of 55% or more and a pore diameter in the range of 0.1 µm to 1 µm. In the present embodiment, a tetrafluoroethylene polymer (PTFE) porous membrane is used as the porous membrane having these conditions. As PTFE membrane, a hydrophilic PTFE may be used. When the porous membrane is hydrophilic, the hydrophilic polymer layer is also formed within the pores of the porous membrane. The porous membrane is not limited to PTFE membrane. In addition to PTFE membrane, for example, resin materials such as polyethersulfone, polyvinyl fluoride, polyvinylidene fluoride, polyphenylene sulfide, polyethylene, polypropylene, polyimide, high molecular weight polyester, heat-resistant polyamide, aramid, polycarbonate, and inorganic materials such as metals, glasses, ceramics, and the like can be used as the porous membrane.

As the shape of the porous membrane, various shapes such as a flat plate shape, a curved surface shape (e.g., a spherical shape, a columnar side surface shape), and a tubular shape (e.g., a cylindrical shape) are conceivable. When the porous membrane has the tubular shape, the hydrophilic polymer layer may be formed on either the outer or inner side of the tubular porous membrane. In the case where the porous membrane has the tubular shape, either the outer side or the inner side of the tubular porous membrane may be a feed side for supplying the gas to be processed.

In addition, the hydrophilic polymer layer may contain ionic liquid, also called ionic fluids, in addition to the amino acid as the $CO_2$ carrier and the deprotonating agent. The content of the ionic liquid is preferable 30 wt % or less, more preferably 20 wt % or less, and still more preferably 10 wt % or less, based on the total weight of the hydrophilic polymer layer excluding the ionic liquid, that is, the total weight of the hydrophilic polymer, the amino acid, and the deprotonating agent included in the hydrophilic polymer layer. This is because if the content of the ionic liquid is too high, the strength of the membrane is lowered, and in particular, the selectivity is also lowered under the condition where there is a pressure difference between the permeate side and the feed side of the membrane. When the ionic liquid is contained in the hydrophilic polymer layer, the above content is greater than 0 wt %, preferably 0.5 wt % or more.

Generally, when the $CO_2$ facilitated transport membrane is used in a high temperature environment of 100° C. or more, the crosslinking of the hydrophilic polymer proceeds, the facilitated transport of carbon dioxide by $CO_2$ carrier is inhibited, and $CO_2$ permeance may be lowered. Under the above circumstances, if the ionic liquid is included in the hydrophilic polymer layer, it is expected that the progress of the crosslinking is suppressed, and as a result, the lowering of $CO_2$ permeance due to the use at a high temperature is suppressed. However, in the present embodiment, since the $CO_2$ facilitated transport membrane is assumed to be used in a substantially room temperature environment of not less than 15° C. and not more than 50° C., the ionic liquid is used not for suppressing the lowering of $CO_2$ permeance due to the progress of crosslink-linking. The ionic liquid is used when at least one of $CO_2$ permeance and $CO_2/O_2$ selectivity can be improved under a low $CO_2$ partial pressure difference due to an effect of the ionic liquid described below. The addition of the ionic liquid has an effect of improving the affinity between the porous membrane supporting the hydrophilic polymer layer and the coating liquid, improving the membrane forming property, and suppressing a portion where the hydrophilic polymer layer is not formed on the porous membrane to be partially made. Further, by appropriately adding the ionic liquid, it is possible to adjust the coating liquid to an appropriate viscosity for coating. Therefore, the ionic liquid is particularly useful when a membrane having a large area is produced.

As the ionic liquid, a chemical substance selected from a compound composed of combinations of the following cations and anions can be used.

Cations: ammonium ion, phosphonium ion, pyridinium ion, imidazolium ion, pyrrolidinium ion, piperidinium ion.

Anion: amino acid ion, chloride ion, bromide ion, boron tetrafluoride ion, nitrate ion, bis(trifluoromethanesulfonyl)imide ion, hexafluorophosphate ion, or trifluoromethanesulfonate ion.

In addition, specific examples of these ionic liquids that can be used include 1-ethyl-3-methylimidazolium glycinate, tetrabutylphosphonium glycinate, tetrabutylphosphonium prolinate, 1-ethyl-3-methylimidazolium chloride, 1-ethyl-3-methylimidazolium bis(trifluoromethylsulfonyl)imide, tetrabutylphosphonium alanine, tetrabutylphosphonium serine, tetraethylphosphonium glycinate, tetramethylphosphonium glycinate, tetramethylammonium glycinate, tetraethylammonium glycinate, tetrabutylammonium glycinate, 1-allyl-3-ethylimidazolium bromide, 1-ethyl-3-methylimidazolium bromide, 1-(2-hydroxyethyl)-3-methylimidazolium bromide, 1-(2-methoxyethyl)-3-methylimidazolium bromide, 1-octyl-3-methylimidazolium chloride, N,N-diethyl-N-methyl-(2-methoxyethyl)ammonium tetrafluoroborate, 1-ethyl-3-methylimidazolium bis(trifluoromethanesulfonyl)imide, 1-ethyl-3-methylimidazolium bistrifluoromethanesulfonic acid, ethylmethylimidazolium dicyanamide and trihexyltetradecyl phosphonium chloride.

Furthermore, since the amino group has reactivity with $CO_2$, the ionic liquid is preferably an amino acid ionic liquid having an amino group. The amino acid used as the amino acid ion may be a compound having one or more amino groups selected from a primary amino group ($—NH_2$), a secondary amino group (—NH—), and a tertiary amino group (—N=), and a carboxyl group, and may be a natural or non-natural compound.

The amino acid ion is, for example, an ion formed from at least one amino acid selected from the group consisting of arginine, histidine, lysine, aspartic acid, glutamic acid, serine, threonine, asparagine, glutamine, cysteine, glycine, proline, alanine, isoleucine, leucine, methionine, phenylalanine, tryptophan, tyrosine, and valine. Part or all of the hydrogen atoms of the amino group of these amino acids may be substituted by an alkyl group or an aryl group. For example, N-alkyl amino acid with the secondary amino group, N-aryl amino acid with the secondary amino group, N, N-dialkyl amino acid with the tertiary amino group, and N-alkyl-N-aryl amino acid with the tertiary amino group can be used. Specific examples of the amino acid ionic liquid include 1-ethyl-3-methylimidazolium glycinate, tetrabutylphosphonium glycinate, tetrabutylphosphonium prolinate, tetrabutylphosphonium alanine, tetrabutylphosphonium serine, tetraethylphosphonium glycinate, tetramethylphosphonium glycinate, tetramethylammonium glycinate, tetraethylammonium glycinate, tetrabutylammonium glycinate, and the like.

Furthermore, from the standpoint of barriers to $O_2$ and $N_2$, it is preferable that a molecular weight of the ionic liquid (in particular, the amino acid ionic liquid) is small, and the molecular weight is preferably 1000 or less, more preferably 500 or less, and still more preferably 200 or less. The lower limit value of the molecular weight is the minimum value of the molecular weight of the chemical substance that can be used as the ionic liquid.

Next, an example of a manufacturing method of the $CO_2$ facilitated transport membrane will be described.

First, the coating liquid consisting of an aqueous solution containing the hydrophilic polymer and the amino acid is prepared (Step 1). More specifically, the hydrophilic polymer is added to water and stirred at room temperature, for example, for 3 days or more, and the amino acid and the deprotonating agent are further added to the resulting solution and stirred until dissolved to obtain the coating solution. When the ionic liquid is included in the hydrophilic polymer layer, the ionic liquid is also added when the amino acid and the deprotonating agent are added in Step 1.

Next, centrifugation (for example, at a rotation speed of 5000 rpm for 30 minutes) is performed in order to remove air bubbles in the coating liquid obtained in Step 1 (Step 2).

Next, the coating liquid obtained in Step 2 is applied onto the surface of the PTFE porous membrane by means of an applicator and uniformly spread (Step 3). Incidentally, the coating thickness of the coating liquid is adjusted so that the weight per unit area of the hydrophilic polymer layer (containing the amino acid and the additive such as the deprotonating agent) gelled in Step 4 described later (hereinafter referred to as "gel-weight" as appropriate) becomes 1 mg/cm$^2$ or more and 100 mg/cm$^2$ or less, preferably 2.5 mg/cm$^2$ or more and 80 mg/cm$^2$ or less, and more preferably 5 mg/cm$^2$ or more and 60 mg/cm$^2$ or less. The gel-weight of the hydrophilic polymer layer is obtained by dividing the weight of the hydrophilic polymer layer after gelation, which is obtained by multiplying the weight of the coating solution applied on the surface of the PTFE porous membrane by the weight fraction of the sum of the hydrophilic polymer, the amino acid, and the additive such as the deprotonating agent, by the application area. When the gel-weight is less than 1 mg/cm$^2$, it is difficult to form a uniform membrane. Here, the PTFE porous membrane may be a hydrophilic PTFE, a hydrophobic PTFE, or a laminate of the hydrophilic PTFE and the hydrophobic PTFE. The coating liquid penetrates into the pores when the hydrophilic PTFE porous membrane is used, but does not penetrate into the pores when the hydrophobic PTFE porous membrane is used.

Next, the PTFE porous membrane to which the coating liquid has been applied is naturally dried, for example, at room temperature for about half a day, and the coating liquid is gelled to form a gelled hydrophilic polymer layer (Step 4). In Step 4, the naturally dried PTFE porous membrane may be further thermally crosslinked at temperatures of about 120° C. for about 2 hours. When the degree of crosslinking in hydrogeling the hydrophilic polymer layer is adjusted by adding the cross-linking agent such as the dialdehyde compound or the aldehyde compound, the cross-linking agent is added to the coating solution in the above Step 1.

Through Steps 1 to 4 described above, the $CO_2$ facilitated transport membrane used in the present process is produced. When the $CO_2$ facilitated transport membrane is in a flat plate shape or the like, it is also preferable to protect the exposed surface of the hydrophilic polymer layer of the completed $CO_2$ facilitated transport membrane by covering the exposed surface of the hydrophilic polymer layer with a porous membrane such as the PTFE porous membrane or the like as required.

Next, the results of evaluating $CO_2$ removing performance in the present method using various samples of the $CO_2$ facilitated transport membrane produced by the above manufacturing method will be described. In the present embodiment, the following evaluations 1 to 7 of $CO_2$ removing performance were carried out by separately measuring the membrane performances of the $CO_2$ facilitated transport membrane for various combinations of the membrane forming conditions and the measuring conditions of the samples used. The membrane performances of the $CO_2$ facilitated transport membrane were measured by appropriately using a decompression method using an evaluation apparatus shown in FIG. 1 and a sweep gas method using an evaluation apparatus shown in FIG. 2. In both decompression method and sweep gas method, $CO_2$ partial pressure differences can occur between the feed side and the permeate side of the $CO_2$ facilitated transport membrane, so the membrane performances of $CO_2$ facilitated transport membrane can be measured. Therefore, if the $CO_2$ differential pressure difference and the relative humidity of the permeate side are the same between both methods, the same measurement result can be obtained. In the present embodiment, in Evaluation 4 in which the effect of the permeate side pressure related to the relative humidity of the permeate side on the membrane performances was examined, the decompression method was adopted.

In the present embodiment, in both of the decompression method and the sweep gas method, the samples of the $CO_2$ facilitated transport membrane 1 to be evaluated are fixed between feed side chamber 3 and permeate side chamber 4 of gas permeation cell 2 while being sandwiched by two circular gaskets. After $CO_2$, $N_2$ and $O_2$ constituting the gas to be processed are merged at the downstream side through the mass flow controller (MFC) and the valves, moisture is conditioned by the water vapor being added by bubbler 5, and excess water droplets are removed at demister 6, the gas to be processed is supplied to the feed side chamber 3 of the gas permeation cell 2 as a feed gas FG with a predetermined mixing ratio. The feed gas FG' in the feed side chamber 3 which has not passed through the $CO_2$ facilitated transport membrane 1 in the feed gas is exhausted out of the system via hygrometer 7. In the present embodiment, in order to maintain the operating temperature of the gas permeation cell 2 constant, the gas permeation cell 2 is installed in thermostatic water tank 8, also the bubbler 5 and the demister 6 are also installed in another thermostatic water tank 9. In the present embodiment, the relative humidity in the feed side chamber 3 are adjusted to 75%, except for the evaluations 6 and 7 described below. In the evaluation apparatus illustrated in FIGS. 1 and 2, the water vapor generated in bubbler 5 is added to the feed gas FG to adjust the relative humidity, but instead of bubbler 5, a water vapor generator for generating water vapor by heating water may be separately provided, and the water vapor generated by the water vapor generator may be added to the feed gas FG. Demister 6 is not necessarily provided.

In the decompression method, the scroll-type vacuum pump 11 is turned coupled through a needle valve 10 to the permeate side chamber 4, and the permeate side pressure Ps in the permeate side chamber 4 is reduced to a predetermined pressure. The reduced pressure is measured with a vacuum meter 12 coupled to the permeate side chamber 4. After helium gas (He) is added at the downstream side of the vacuum pump 11 to the processed gas (PG) sucked from the permeate side chamber 4 by the vacuum pump 11, and water vapor is removed from the processed gas (PG) by a cold trap 13, the gas composition of the processed gas (PG) is determined by gas chromatograph 14. In the decompression method of the present embodiment, the feed side pressure Pf in the feed side chamber 3 is the atmospheric pressure (101.3 kPa).

In the sweep gas method, the sweep gas SG (in this embodiment, using helium gas (He)), is supplied to the permeate side chamber 4 via the mass flow controller (MFC) and the valve. The processed gas PG, which is delivered together with the sweep gas SG from the permeate side chamber 4, has its gas composition determined in the gas chromatograph 14 after the water vapor has been removed in the cold trap 13. In the sweep gas method of the present embodiment, the permeate side pressure Ps and the feed side pressure Pf are atmospheric pressure (101.3 kPa).

Incidentally, as for $N_2$ and $O_2$ that permeate through the $CO_2$ facilitated transport membrane 1 with the same physical dissolution and diffusion mechanism, as described above, since $O_2$ permeance is greater than $N_2$ permeance, $CO_2/N_2$ selectivity (=$CO_2$ permeance/$N_2$ permeance) is higher than $CO_2/O_2$ selectivity (=$CO_2$ permeance/$O_2$ permeance) (in the present embodiment, it is about 1.9 times). Therefore, in the measurement of the membrane performances of $CO_2$ facilitated transport membrane in the present embodiment, only the membrane performances of the three items of $CO_2$ permeance, $O_2$ permeance, and $CO_2/O_2$ selectivity were measured, and the measurements of $N_2$ permeance and $CO_2/N_2$ selectivity were omitted. Therefore, in measuring the membrane performances of the three items, since $N_2$ in the feed gas FG is not necessary, an $N_2$ concentration in the feed gas FG was 0% for convenience of measuring. The higher $CO_2$ permeance, the lower $O_2$ permeance, and the higher $CO_2/O_2$ selectivity, the higher the performance of the $CO_2$ facilitated transport membrane used in this method.

Next, the measurement contents of the membrane performances in Evaluations 1 to 7 below and the samples #1 to #15 used in the measurement will be described. As the PTFE porous membranes of samples #1 to #15, a 47 mm diameter laminate in which a hydrophilic PTFE porous membrane was superposed on a hydrophobic PTFE porous membrane was commonly used. Gaskets having an inner diameter of 37 mm and an outer diameter of 57 mm were used to sandwich the samples #1 to #15 of the $CO_2$ facilitated transport membrane 1. The hydrophilic polymer layers of each of Samples #1 to #15 are hydrogels having a three-dimensional network structure. Incidentally, in FIGS. 3 to 16 showing the measured results of the membrane performances in Evaluations 1 to 7, $CO_2$ permeance, $O_2$ permeance, and $CO_2/O_2$ selectivity are denoted as $KCO_2$, $KO_2$, and $\alpha$ ($CO_2/O_2$), respectively.

[Evaluation 1]

In Evaluation 1, the effect of the difference of $CO_2$ carrier in the hydrophilic polymer on the membrane performances of the above three items was examined by the sweep gas method using Samples #1 and #2. The measurement results of the membrane performances of the above three items are shown in FIG. 3. The $CO_2$ concentration and the $O_2$ concentration in the feed gas FG on a dry basis were fixed to 0.7 mol % and 99.3 mol %. The processing temperature was set to 26.7° C.

The hydrophilic polymers of samples #1 and #2 are PVA/PAA salt copolymers (Cs-salts) and the gel-weight of the hydrophilic polymer layers is about 25 mg/cm². Sample #1 uses glycine, which is the amino acid, as the $CO_2$ carrier, and CsOH as the deprotonating agent. Thus, in Sample #1, CsOH functions exclusively as the deprotonating agent and hardly as a $CO_2$ carrier. In samples #3 to #15 described later, similarly to sample #1, glycine, which is an amino acid, is used as the $CO_2$ carrier, and CsOH is used as the deprotonating agent, and CsOH functions exclusively as the deprotonating agent, and does not or hardly function as the $CO_2$ carrier. The amino acid used as the $CO_2$ carrier is not limited to glycine, and may be, for example, DAPA. In Sample #2, no amino acid was added as the $CO_2$ carrier, and CsOH of the deprotonating agent was used as the $CO_2$ carrier. In samples #1 and #2, no ionic liquid was added to the hydrophilic polymer. PVA/PAA salt copolymer (Cs salt) means that the structural units constituting the PAA (polyacrylic acid) are derived from the cesium acrylate salt.

The weight fractions of the hydrophilic polymer, $H_2O$, glycine, and CsOH in the coating liquid prepared in Step 1 of the manufacturing method for Samples #1 and #2 were set to be 0.0388:0.790:0.0567:0.114 for Sample #1, and 0.0404: 0.824:0:0.136 for Sample #2, respectively in the order described, in order to properly compare the respective $CO_2$ carriers of Samples #1 and #2. CsOH is added as a monohydrate, and the weight of $H_2O$ for the monohydrate is added to the weight fraction of $H_2O$. CsOH added in Sample #1 is slightly more than an equivalent amount to glycine.

The compositions of the $CO_2$ facilitated transport membranes in Samples #1 and #2 differ only in the type of the $CO_2$ carrier, and are otherwise the same. Sample #1 uses glycine, which is the amino acid, as the $CO_2$ carrier and is one example of the $CO_2$ facilitated transport membrane for use in the present process. Sample #2 is a comparative example in which CsOH was used as the $CO_2$ carrier and is the $CO_2$ facilitated transport membrane not used in the present method. Comparing the results of the measurements of Samples #1 and #2 on the membrane performances of the above three items, it is clear that Sample #1 has higher $CO_2$ permeance, lower $O_2$ permeance, and higher $CO_2/O_2$ selectivity, and performs better than sample #2 for all three items.

[Evaluation 2]

In Evaluation 2, the effects of the type of hydrophilic polymer, the presence or absence and type of the ionic liquid in the hydrophilic polymer layer, and the gel-weight of the hydrophilic polymer on the membrane performances of the above three items were examined by the sweep gas method using Samples #3 to #7. Samples #3 to #7 are all examples of the $CO_2$ facilitated transport membranes for use in the present method. The measurement results of the membrane performances of the above three items are shown in FIGS. 4 to 9. The $CO_2$ concentration and the $O_2$ concentration in the feed gas FG on a dry basis were fixed to 0.7 mol % and 99.3 mol %. The processing temperature was set to 26.7° C. Each of Samples #3 to #7 is composed of a plurality of samples having different gel-weights of the hydrophilic polymer, that is, different coating thicknesses of the coating liquid in Step 3 of the above-described manufacturing method.

The hydrophilic polymers of Samples #3 to #7 are PAA (Na salt) for Samples #3 and #6, PVA/PAA salt copolymer (Na salt) for Samples #4 and #7, and PVA/PAA salt copolymer (Cs salt) for Sample #5. The PAA (Na salt) and PVA/PAA salt copolymer (Na salt) mean that the structural units constituting the PAA (polyacrylic acid) are derived from the sodium acrylate salt.

Samples #3 to #7 use glycine, which is amino acid, as the $CO_2$ carrier, and CsOH as the deprotonating agent.

Regarding the ionic liquid of Samples #3 to #7, no ionic liquids are added in Samples #3 to #5, tetrabutylphosphonium glycinate ([P4444][Gly], molecular weight: 333.49) is added in Sample #6, and 1-ethyl-3-methylimidazolium glycinate ([EMIM][Gly], molecular weight: 185.22) is added in Sample #7. In Sample #6 and Sample #7, the ionic liquids are added at 9.9 wt % and 9.3 wt % based on the combined weight of the hydrophilic polymer, glycine and CsOH, respectively.

Sample #3 consists of 8 samples with a gel-weight in 2.4 mg/cm² to 19.9 mg/cm² range, Sample #4 consists of 6 samples with a gel-weight in 7.1 mg/cm² to 12.5 mg/cm² range, Sample #5 consists of 8 samples with a gel-weight in 6 mg/cm² to 18.2 mg/cm² range, Sample #6 consists of 2 samples with a gel-weight in 3.5 mg/cm² to 9 mg/cm² range, and Sample #7 consists of 4 samples with a gel-weight in 7.2 mg/cm² to 12.6 mg/cm² range.

Figure 4:
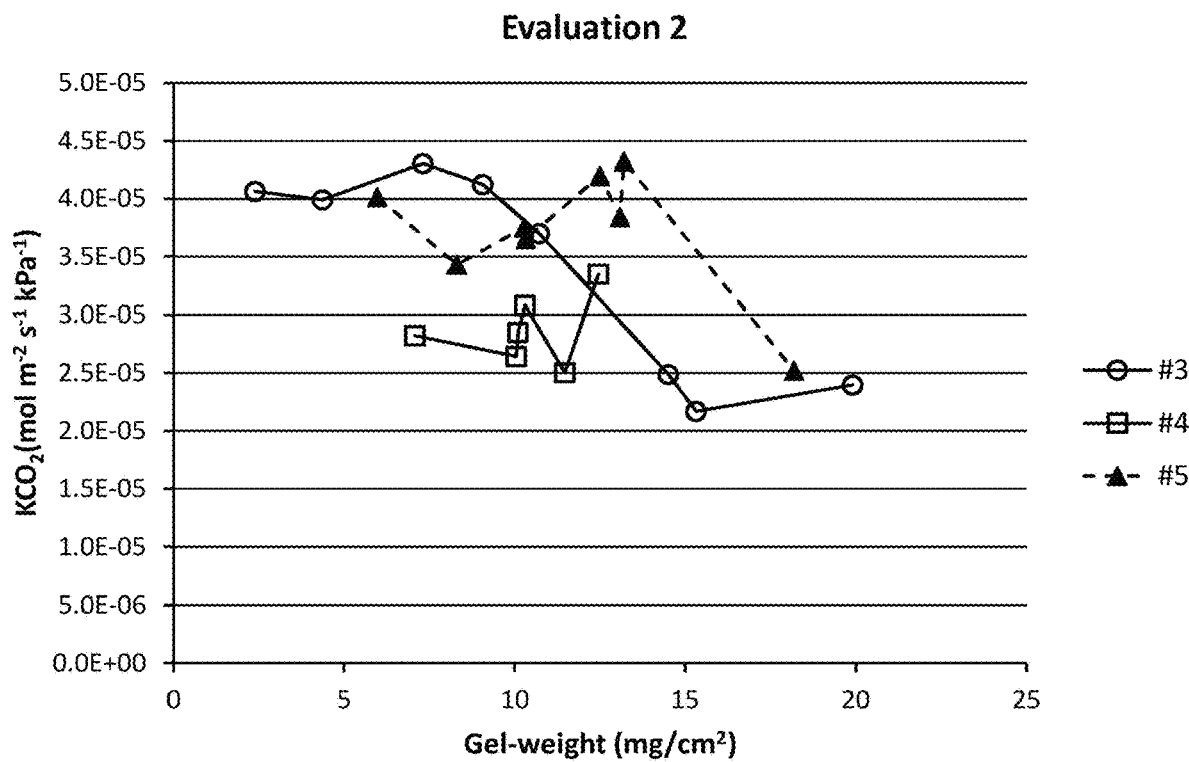
FIG. 4 is a graph showing a relation between $CO_2$ permeance and gel-weight of the $CO_2$ facilitated transport membrane (Samples #3-5).
Figure 5:
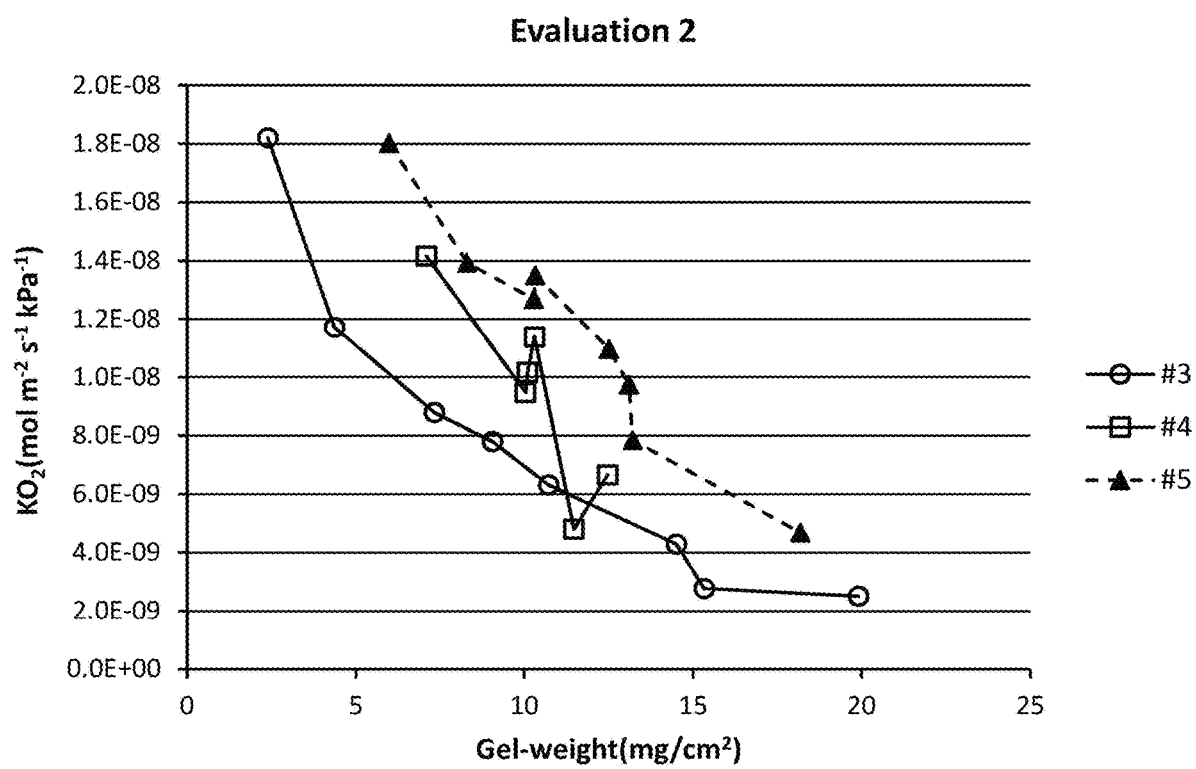
FIG. 5 is a graph showing a relation between $O_2$ permeance and gel-weight of $CO_2$ facilitated transport membrane (Samples #3-5).
Figure 6:
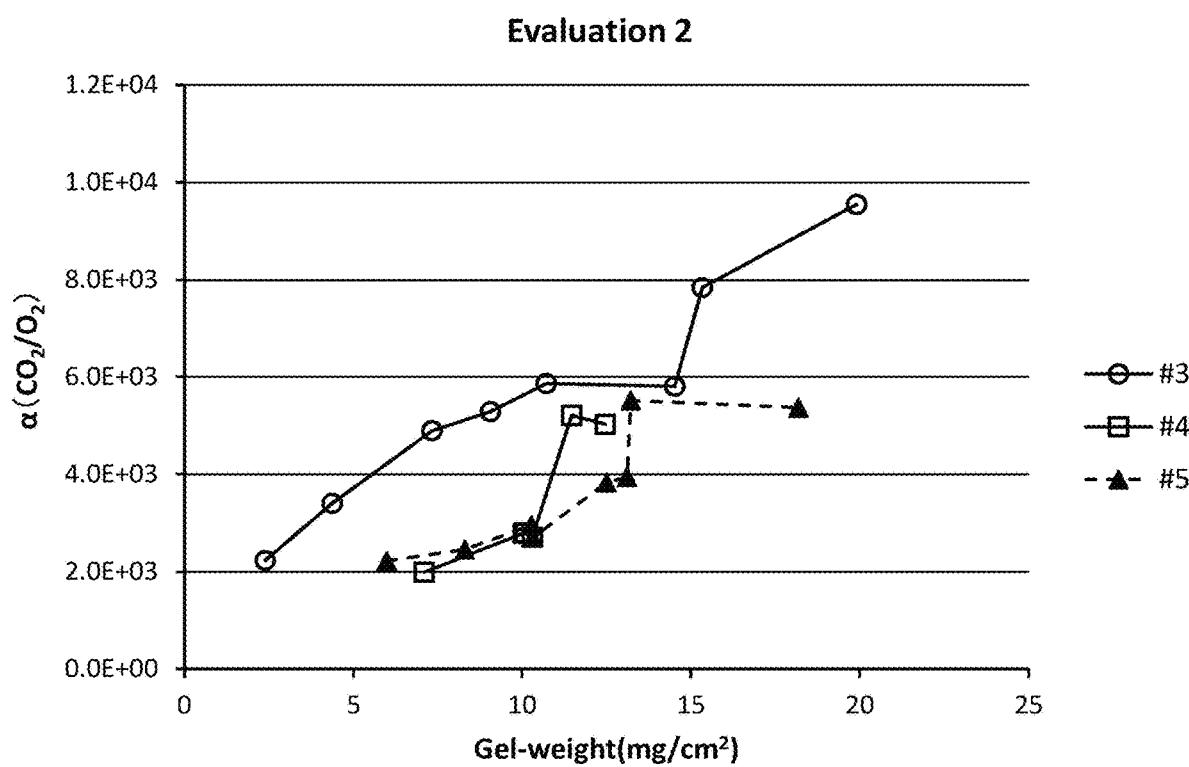
FIG. 6 is a graph showing a relation between $CO_2/O_2$ selectivity and gel-weight of the $CO_2$ facilitated transport membrane (Samples #3 to #5).

FIG. 4 shows the relation between $CO_2$ permeance and the gel-weight of Samples #3 to #5. FIG. 5 shows the relation between $O_2$ permeance and the gel-weight of Samples #3 to #5. FIG. 6 shows the relation between $CO_2/O_2$ selectivity and the gel-weight of Samples #3 to #5. The compositions of the $CO_2$ facilitated transport membranes in Samples #3 to #5 differ only in the types of the hydrophilic polymers, and are otherwise the same. Hereinafter, the measurement results of the membrane performances of the above three items of Samples #3 to #5 will be compared and examined.

From FIG. 4, it can be seen that $CO_2$ permeance tends to decrease gradually with increasing gel-weight for Samples #3 and #5 regardless of the type of the hydrophilic polymer. For Sample #4, there is no tendency to decrease gradually with increasing gel-weight. These tendencies coincide with the results of Evaluation 4 described later (see FIG. 11).

From FIG. 5, the tendency of $O_2$ permeance to decrease with increasing gel-weight for Samples #3 and #5 regardless of the type of the hydrophilic polymer appears to be greater than that of $CO_2$ permeance. For Sample #4, $O_2$ permeance also decreases roughly with increasing gel-weight. These tendencies coincide with the results of Evaluation 4 described later (see FIG. 12).

From FIG. 6, it can be seen that $CO_2/O_2$ selectivity tends to increase with increasing gel-weight for Samples #3 to #5. These tendencies coincide with the results of Evaluation 4 described later (see FIG. 13). For Samples #3 to #5, high $CO_2/O_2$ selectivity of 2000 or more has been obtained within a gel-weight range of 2 mg/cm² to 20 mg/cm², regardless of the type of the hydrophilic polymer. When the results of Evaluations 3 and 4 described later are combined, $CO_2/O_2$ selectivity tends to increase with increasing gel-weight even in a range that the gel-weight exceeds 20 mg/cm². Therefore, even if the gel-weight increases to the extent of 100 mg/cm², it is preferable in terms of $CO_2/O_2$ selectivity and $O_2$ permeance. However, since $CO_2$ permeance decreases and a large membrane area is required to secure the same $CO_2$ removal amount, it is not considered to be advantageous to increase the gel-weight beyond 100 mg/cm².

Figure 7:
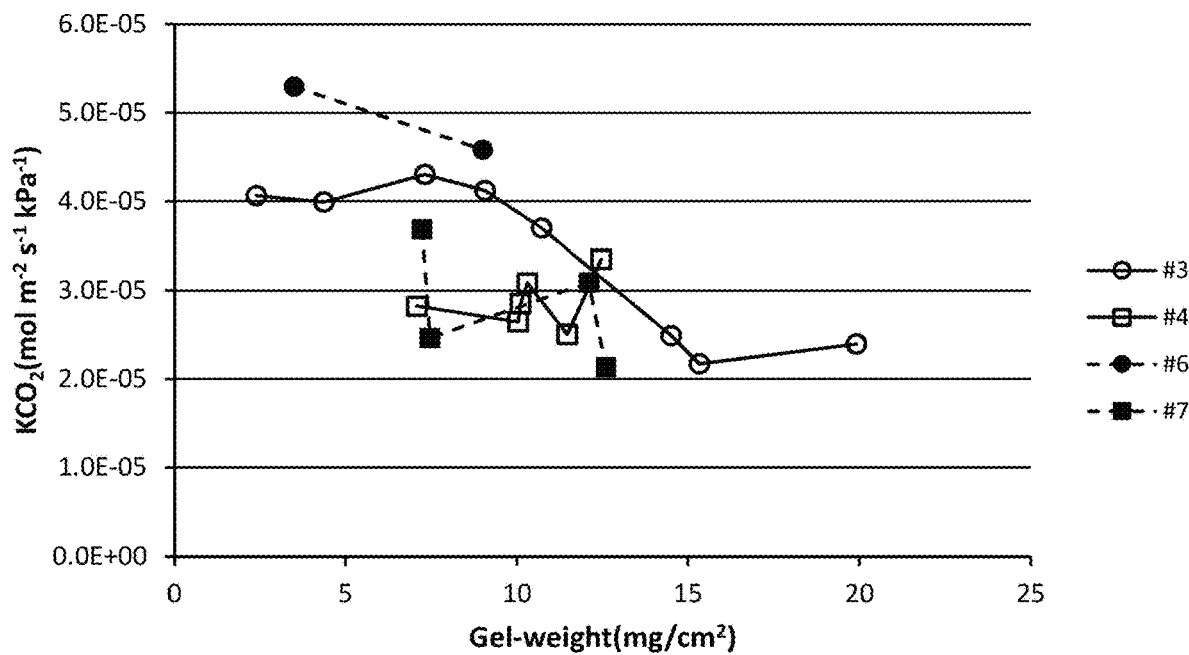
FIG. 7 is a graph showing a relation between $CO_2$ permeance and gel-weight of the $CO_2$ facilitated transport membrane (Samples #3, #4, #6, #7).
Figure 8:
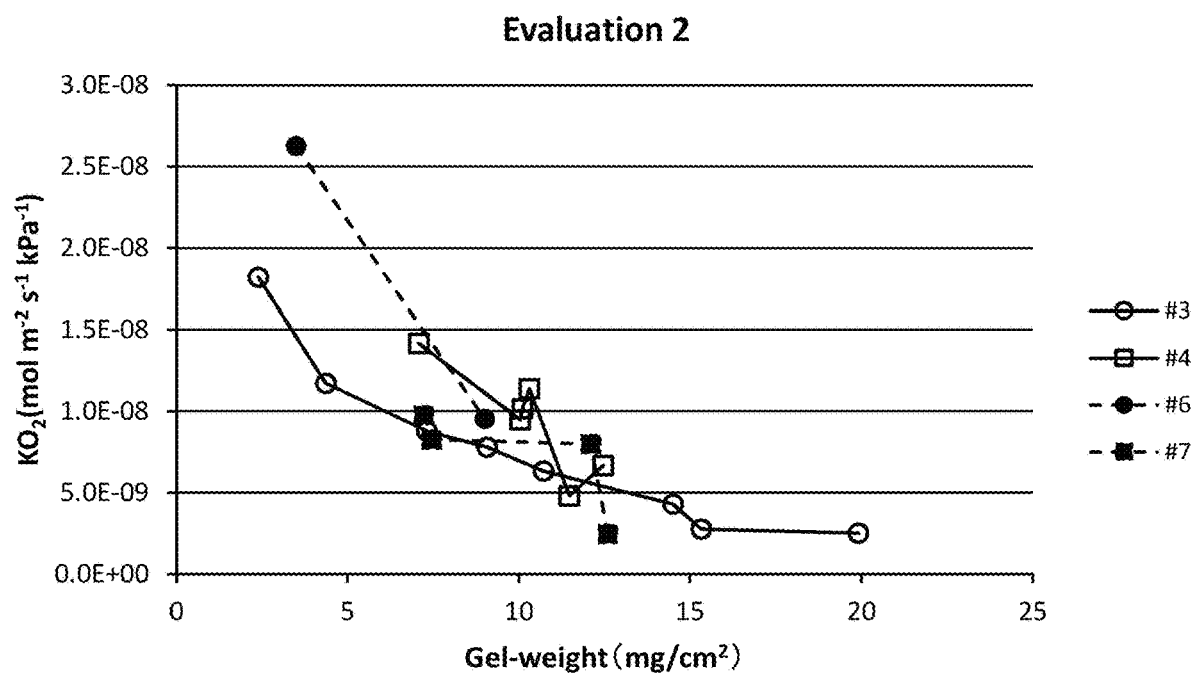
FIG. 8 is a graph showing a relation between $O_2$ permeance and gel-weight of the $CO_2$ facilitated transport membrane (Samples #3, #4, #6, #7).
Figure 9:
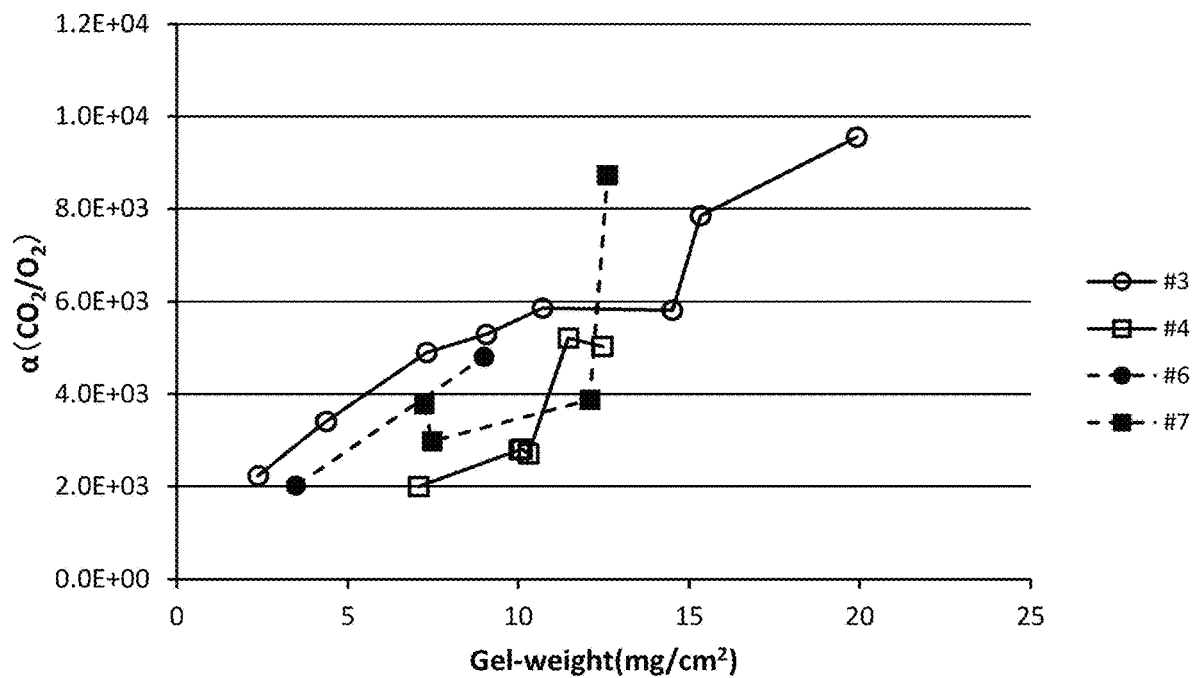
FIG. 9 is a graph showing a relation between $CO_2/O_2$ selectivity and gel-weight of the $CO_2$ facilitated transport membrane (Samples #3, #4, #6, #7).

FIG. 7 shows the relation between $CO_2$ permeance and the gel-weight of Samples #3, #4, #6, and #7. FIG. 8 shows the relation between $O_2$ permeance and the gel-weight of Samples #3, #4, #6, and #7. FIG. 9 shows the relation between $CO_2/O_2$ selectivity and the gel-weight of Samples #3, #4, #6, and #7. The compositions of the $CO_2$ facilitated transport membranes in Samples #3, #4, #6, and #7 differ between Samples #3 and #6 and between Samples #4 and #7 in the presence or absence of the ionic liquid in the hydrophilic polymer layer, and are otherwise the same. Hereinafter, the measurement results of the membrane performances of the above three items of Samples #3 and #6 and Samples #4 and #7 will be compared and examined.

Samples #3 and #6 and Samples #4 and #7 differ in the presence or absence of the ionic liquid, respectively, but from the measurement results of the membrane performances of the above three items in FIGS. 7 to 9, the difference in membrane performances depending on the presence or absence of the ionic liquid is not noticeable. In Samples #6 and #7, high $CO_2/O_2$ selectivity of 2000 or more has been obtained regardless of the type of the hydrophilic polymers and the type of the ionic liquid.

[Evaluation 3]

In Evaluation 3, in addition to Evaluation 2, the effect of the type of the ionic liquid in the hydrophilic polymer layer on the membrane performances of the above three items was examined by the sweep gas method using Samples #8 to #11. Samples #8 to #11 are all examples of the $CO_2$ facilitated transport membranes for use in the present method. FIG. 10 shows the measurement results of the membrane performances of the above three items. The $CO_2$ concentration and the $O_2$ concentration in the feed gas FG on a dry basis were fixed to 0.7 mol % and 99.3 mol %. The processing temperature was set to 26.7° C.

The hydrophilic polymers of Samples #8 to #11 are all PVA/PAA salt copolymers (Cs salt) and the gel-weight of the hydrophilic polymer layer is about 25 mg/cm². Samples #8 to #11 use glycine, which is amino acid, as the $CO_2$ carrier, and CsOH as the deprotonating agent.

Regarding the ionic liquid of Samples #8 to #11, 1-ethyl-3-methylimidazolium chloride ([EMIM][Cl], molecular weight: 146.62) is added in Sample #8, tetrabutylphosphonium glycinate ([P4444][Gly], molecular weight: 333.49) is added in Sample #9, 1-ethyl-3-methylimidazolium bis(trifluoromethylsulfonyl)imide ([EMIM][Tf2N], molecular weight: 391.30) is added in Sample #10, and tetrabutylphosphonium prolinate ([P4444][Pro], molecular weight: 359.52) is added in Sample #11.

The weight fractions of the hydrophilic polymer, $H_2O$, glycine, and CsOH in the coating liquids of Samples #8 to #11 were the same as that of Sample #1, and the ionic liquid was added at 7.5 wt % based on the total weight of the hydrophilic polymer, glycine, and CsOH.

The compositions of the $CO_2$ facilitated transport membrane in Samples #8 to #11 differ only in the type of the ionic liquid, and are otherwise the same. Comparing the measured results of the membrane performances of the above three items of Sample #8 to #11, $CO_2$ permeance is $1.25 \times 10^{-5}$ to $1.7 \times 10^{-5}$ (mol·m⁻²·s⁻¹·kPa⁻¹), which varies depending on the type of the ionic liquid, but at approximately the same permeance. The value is slightly smaller than that of Sample #1 with no ionic liquid added, but it is about four times larger than that of the comparative example of Sample #2. $O_2$ permeance is $5.19 \times 10^{-9}$ to $7.69 \times 10^{-9}$ (mol·m⁻²·s⁻¹·kPa⁻¹), which varies depending on the type of the ionic liquid, but at approximately the same permeance. The value is roughly the same as that of Sample #1 with no ionic liquid added and that of the comparative example of Sample #2. $CO_2/O_2$ selectivity is 1866 to 2755, which varies depending on the type of ionic liquid, and is about half that of Sample #1 with no ionic liquid added, but high selectivity of 1800 or more has been realized, which is three times or more higher than that of the comparative example of Sample #2. From the above, as far as the results of Samples #8 to #11 are examined, the effect of adding the ionic liquid is not observed.

[Evaluation 4]

Figure 11:
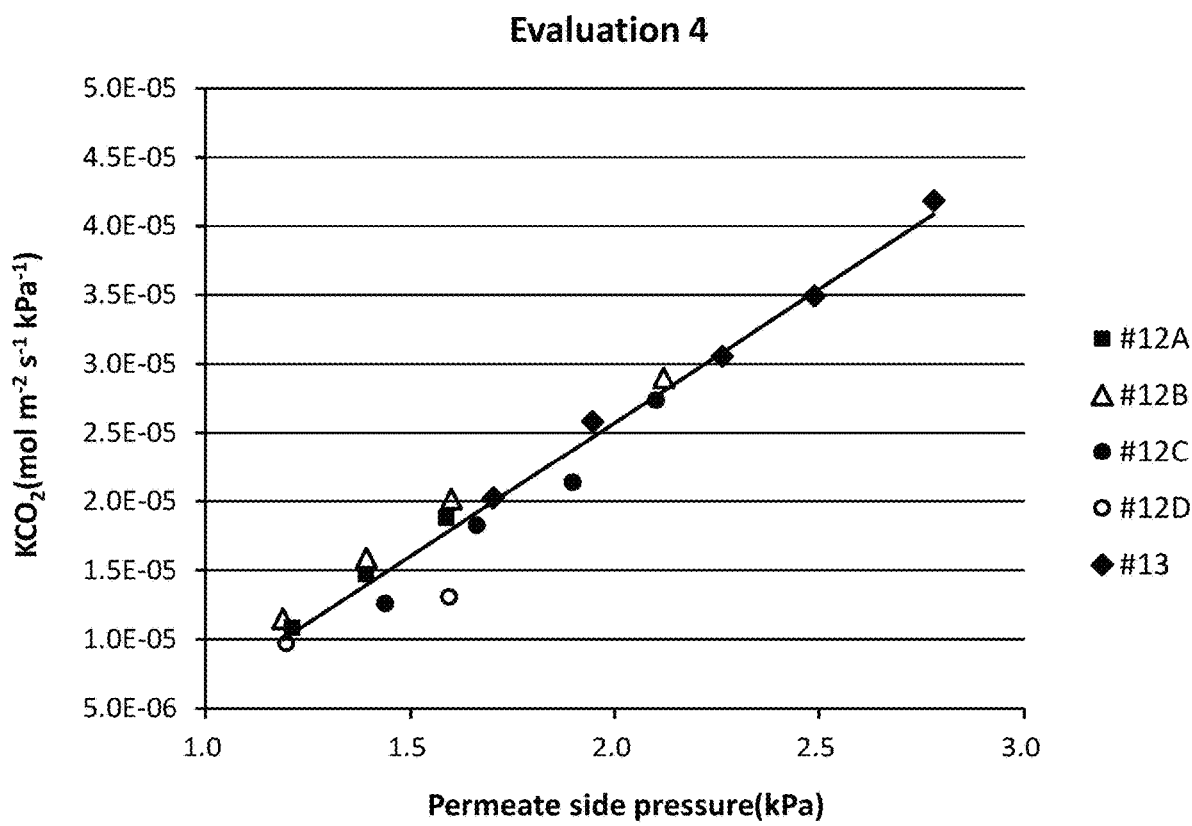
FIG. 11 is a graph showing a relation between $CO_2$ permeance and a permeate side pressure of the $CO_2$ facilitated transport membrane (Samples #12, #13).
Figure 12:
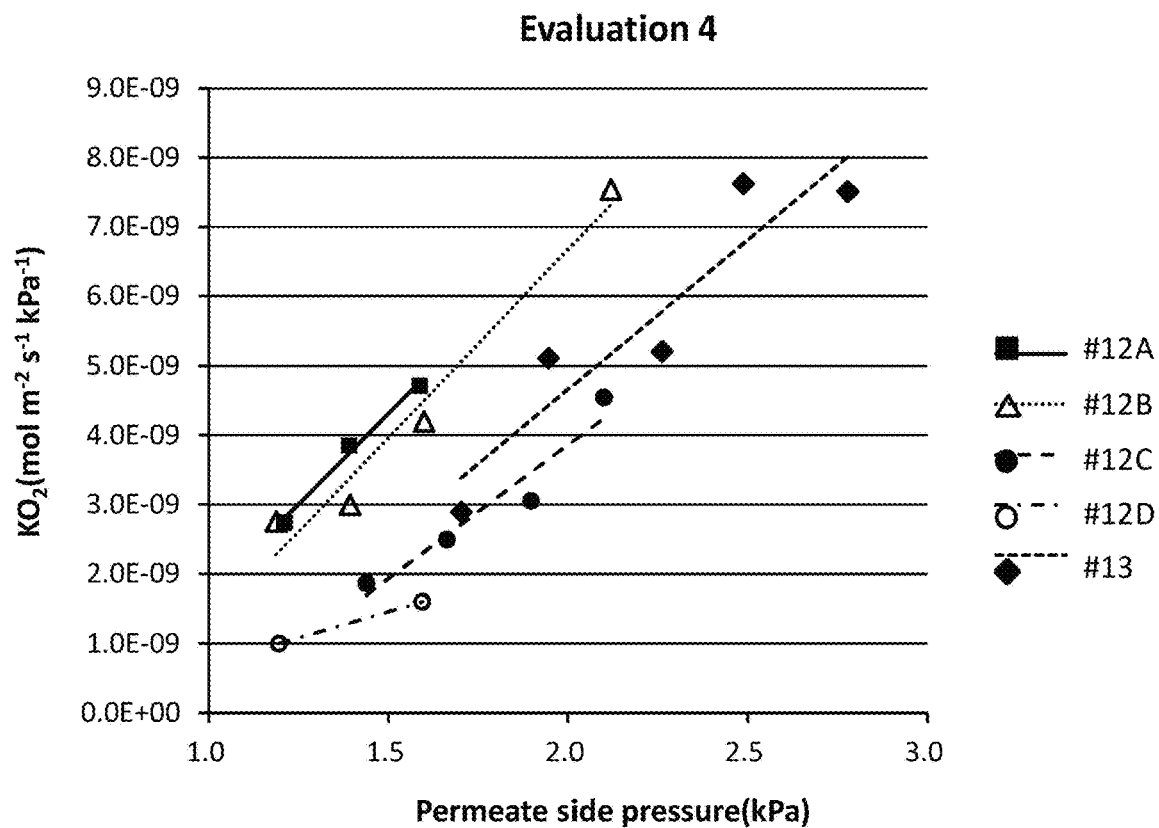
FIG. 12 is a graph showing a relation between $O_2$ permeance and a permeate side pressure of the $CO_2$ facilitated transport membrane (Samples #12, #13).
Figure 13:
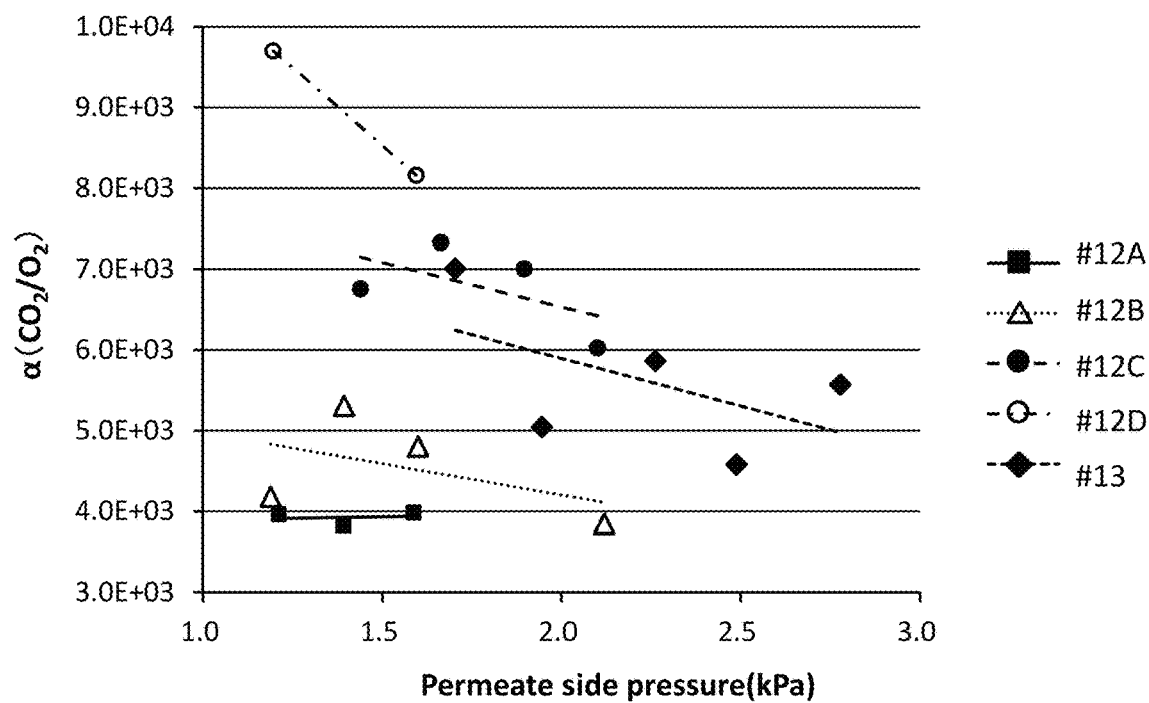
FIG. 13 is a graph showing a relation between $CO_2/O_2$ selectivity and a permeate side pressure of the $CO_2$ facilitated transport membrane (Samples #12, #13).

In Evaluation 4, the effects of the gel-weight and the permeate side pressure of the hydrophilic polymer layer on the membrane performances of the above three items were examined by the decompression method using Samples #12 and #13. The measurement results of the membrane performances of the above three items are shown in FIGS. 11 to 13. The $CO_2$ concentration and the $O_2$ concentration in the feed gas FG on a dry basis were fixed to 0.7 mol % and 99.3 mol %. The processing temperature was set to 26.7° C. Sample #12 is composed of four samples #12A to #12D having different gel-weights of the hydrophilic polymer, that is, different coating thicknesses of the coating liquid in Step 3 of the above-described manufacturing method. Samples #12A-12D and Sample #13 are all examples of the $CO_2$ facilitated transport membranes for use in the present method.

FIG. 11 shows the relation between $CO_2$ permeance and the permeate side pressure. FIG. 12 shows the relation between $O_2$ permeance and the permeate side pressure. FIG. 13 shows the relation between $CO_2/O_2$ selectivity and the permeate side pressure. In FIG. 11, a straight line obtained by linearly approximating the relation between $CO_2$ permeance and the permeate side pressures is added to all five samples. In FIGS. 12 and 13, straight lines obtained by linearly approximating the relation between $O_2$ permeance and the permeate side pressures and the relation between $CO_2/O_2$ selectivity and the permeate side pressure are added for every sample.

Samples #12 and #13 use PVA/PAA salt copolymer (Cs salt) as the hydrophilic polymer, glycine, which is the amino acid, as the $CO_2$ carrier, and CsOH as the deprotonating agent.

Regarding the ionic liquid of Samples #12 and #13, tetrabutylphosphonium glycinate ([P4444][Gly], molecular weight: 333.49) is added in Sample #12, and 1-ethyl-3-methylimidazolium glycinate ([EMIM][Gly], molecular weight: 185.22) is added in Sample #13. The ionic liquids are added at 8.1 wt %, 6.1 wt % and 7.6 wt %, respectively, in Samples #12A, #12B and #12D, Sample #12C, and Sample #13 based on the total weight of the hydrophilic polymers, glycine, and CsOH.

The gel-weights of the hydrophilic polymers of Samples #12A-12D are 7 mg/cm$^2$, 12 mg/cm$^2$, 14 mg/cm$^2$, and 22 mg/cm$^2$, increasing in order, and the gel-weight of the hydrophilic polymer of Sample #13 is 13 mg/cm$^2$.

As is apparent from FIG. 11, $CO_2$ permeance increases almost linearly as the permeate side pressure increases without being greatly affected by the difference in the gel-weight and the difference in the ionic liquid. Since the permeance of the water vapor is about 100 times larger than $CO_2$ permeance and $O_2$ permeance is as small as about 1/4000 to 1/10000 of $CO_2$ permeance, the partial pressure of water vapor $P_{H2O}$ in the permeate side chamber is approximately equal to the permeate side pressure Ps. Therefore, when the saturated water vapor pressure at the temperature in the permeate side chamber is $P_{SAT}$, the relative humidity RH in the permeate side chamber is represented by the following Equation 1. The higher the permeate side pressure Ps, the higher the relative humidity RH. Therefore, as the permeate side pressure Ps increases, the relative humidity RH increases, and then the water content in the hydrophilic polymer, the diffusion rate and the reaction rate, and the permeation rate increase, respectively. These result in the above $CO_2$ permeance increase.

$$RH=(P_{H2O}/P_{SAT})\times 100 \approx (Ps/P_{SAT})\times 100 \quad \text{(Equation 1)}$$

On the other hand, as is apparent from FIG. 12, $O_2$ permeance increases as the permeate side pressure increases, similarly to $CO_2$ permeance, but is greatly affected by the gel-weight because of the physical dissolution and diffusion mechanism, and $O_2$ permeance is smaller for samples having the larger gel-weight. $CO_2$ permeance has a slight tendency to be smaller for samples with the higher gel-weight, but is not so significant as $O_2$ permeance.

As is apparent from FIG. 13, $CO_2/O_2$ selectivity tends to be higher for samples with higher gel-weights and to decrease as the permeate side pressure increases. Since the saturated water vapor pressure is about 3.5 kPa when the temperature in the permeate side chamber 4 is 26.7° C., it is understood from FIG. 13 that high $CO_2/O_2$ selectivity of about 3000 or more can be obtained when the gel-weight is 7 mg/cm$^2$ or more in the range of the permeate side pressure Ps from 1 kPa to the saturated water vapor pressure $P_{SAT}$ (about 3.5 kPa).

[Evaluation 5]

Figure 14A:
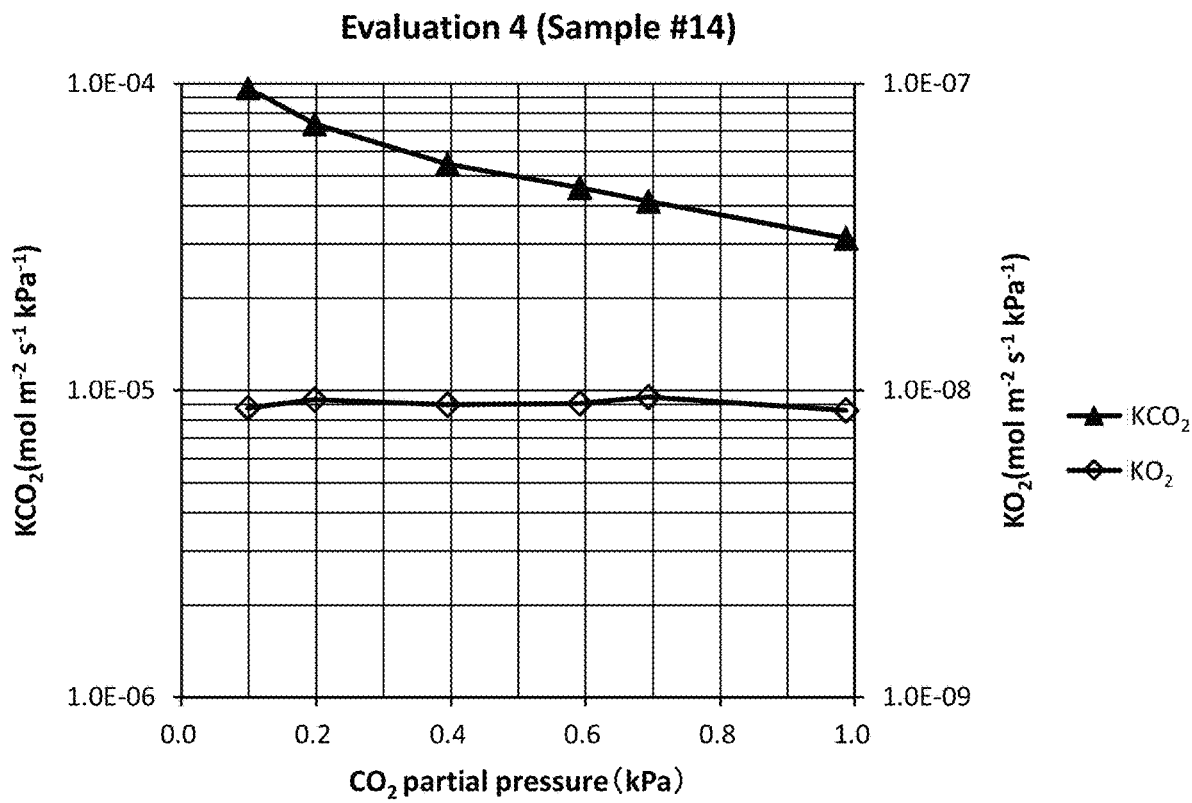
FIGS. 14A and 14B are graphs showing relations between the membrane performances ($CO_2$ permeance, $O_2$ permeance, $CO_2/O_2$ selectivity) and partial pressure of $CO_2$ of the $CO_2$ facilitated transport membrane (Sample #14).
Figure 14B:
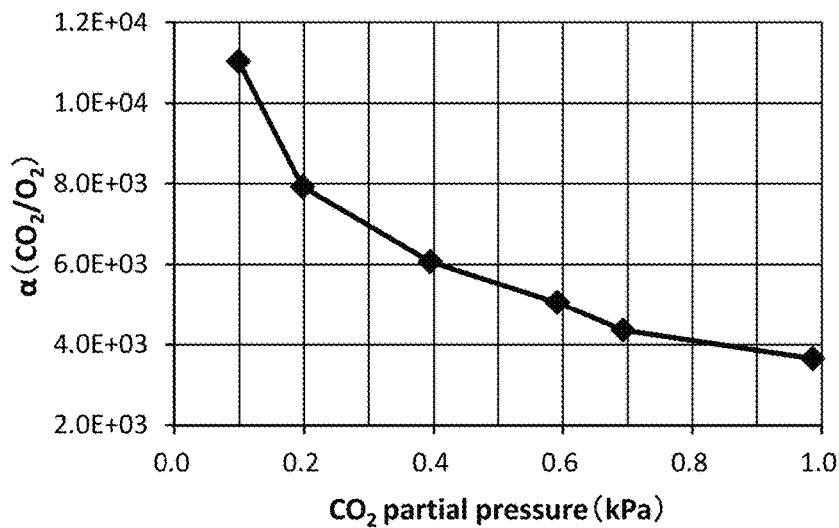

In Evaluation 5, the effect of $CO_2$ partial pressure of the feed gas FG on the membrane performances of the above three items was examined by the sweep gas method using Sample #14, which is one example of the $CO_2$ facilitated transport membrane for use in this method. The measurement results of the membrane performances of the above three items are shown in FIGS. 14A and 14B. $CO_2$ partial pressure of the feed gas FG is increased from 0.0986 kPa to 0.9866 kPa in six stages, and corresponds to 0.0999 mol % to 1 mol % in terms of the $CO_2$ concentration on a dry basis in the feed gas FG. The processing temperature was set to 26.7° C. Since the saturated water vapor pressure at 26.7° C. is 3.504 kPa, there is no significant difference between the $CO_2$ concentration on a dry basis and the $CO_2$ concentration on a wet basis in the feed gas FG.

The hydrophilic polymer of Sample #14 is PAA (Na salt) and the gel-weight of the hydrophilic polymer layer is about 9 mg/cm$^2$. Sample #14 uses glycine, which is the amino acid, as the $CO_2$ carrier, and CsOH as the deprotonating agent. No ionic liquid is added.

FIG. 14A shows the relations between $CO_2$ permeance and the $CO_2$ partial pressure, and between $O_2$ permeance and the $CO_2$ partial pressure in Sample #14. FIG. 14B shows the relation between $CO_2/O_2$ selectivity and the $CO_2$ partial pressure in Sample #14.

From FIGS. 14A and 14B, $CO_2$ permeance tends to decrease with increasing the $CO_2$ partial pressure, whereas $O_2$ permeance is almost constant regardless of the $CO_2$ partial pressure. Therefore, $CO_2/O_2$ selectivity tends to decrease as the $CO_2$ partial pressure increases. In the present embodiment, the $CO_2$ concentration of the gas to be processed is assumed to be 3 mol % or less, but in Evaluation 5, the measurements have not performed with the concentrations less than 0.0999 mol % and exceeding 1 mol % are not measured. However, from the viewpoint of $CO_2/O_2$ selectivity, since the degree of decrease is slowed in the range exceeding 1 mol %, it is well expected that high $CO_2/O_2$ selectivity of around 2000 can be maintained even when the $CO_2$ concentration increases, for example, as high as 2 mol %, and high $CO_2/O_2$ selectivity of 1000 or more can be maintained even when the concentration increases as high as 3 mol %. It is also apparent that extremely high $CO_2/O_2$ selectivity over 10000 can be achieved in the range of the $CO_2$ concentration lower than 0.0999 mol %.

[Evaluation 6]

In Evaluation 6, the effect of the relative humidity of the feed side and the permeate side on the membrane performances of the above three items was examined by the sweep gas method using Sample #15, which is an example of the $CO_2$ facilitated transport membrane for use in the present method. The membrane performances of the above three items were measured at three points of 50%, 60%, and 75% in relative humidity when the $CO_2$ partial pressure was 0.7 kPa, and at three points of 50%, 60%, and 70% in relative humidity when the $CO_2$ partial pressure was 1.01 kPa. The processing temperature was set to 26.7° C.

The hydrophilic polymer of Sample #15 is PVA/PAA salt copolymer (Cs salt) and the gel-weight of the hydrophilic polymer layer is about 13 mg/cm$^2$. Sample #15 uses glycine, which is the amino acid, as the $CO_2$ carrier, and an equivalent amount of CsOH as the deprotonating agent. No ionic liquid is added.

Figure 15A:
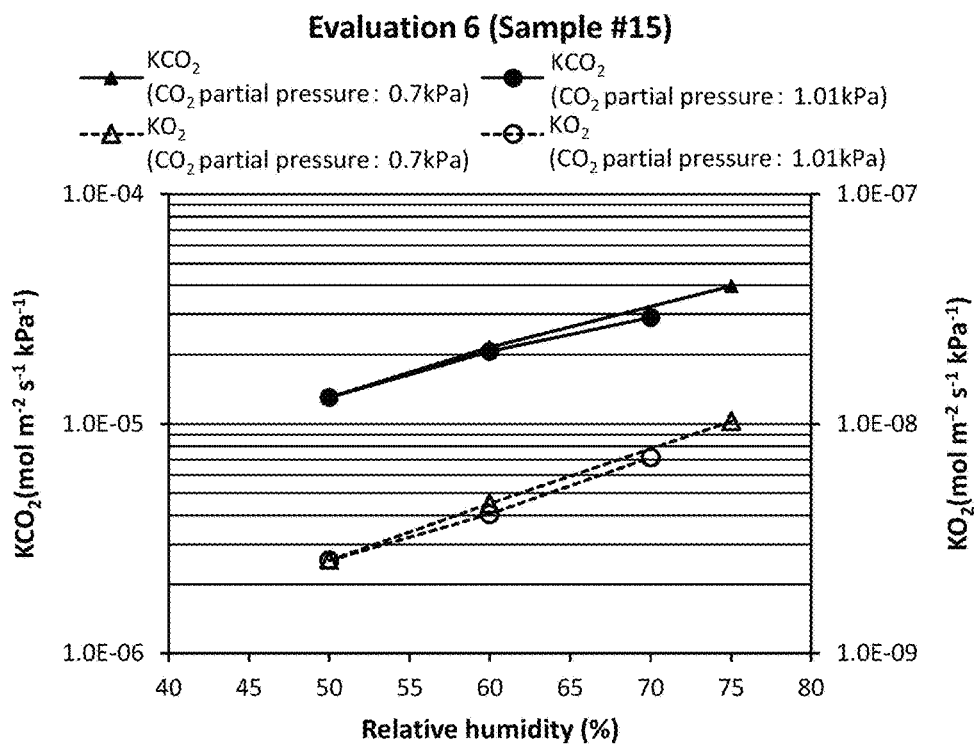
FIGS. 15A and 15B are graphs showing relations between the membrane performances ($CO_2$ permeance, $O_2$ permeance, $CO_2/O_2$ selectivity) and relative humidity of the $CO_2$ facilitated transport membrane (Sample #15).
Figure 15B:
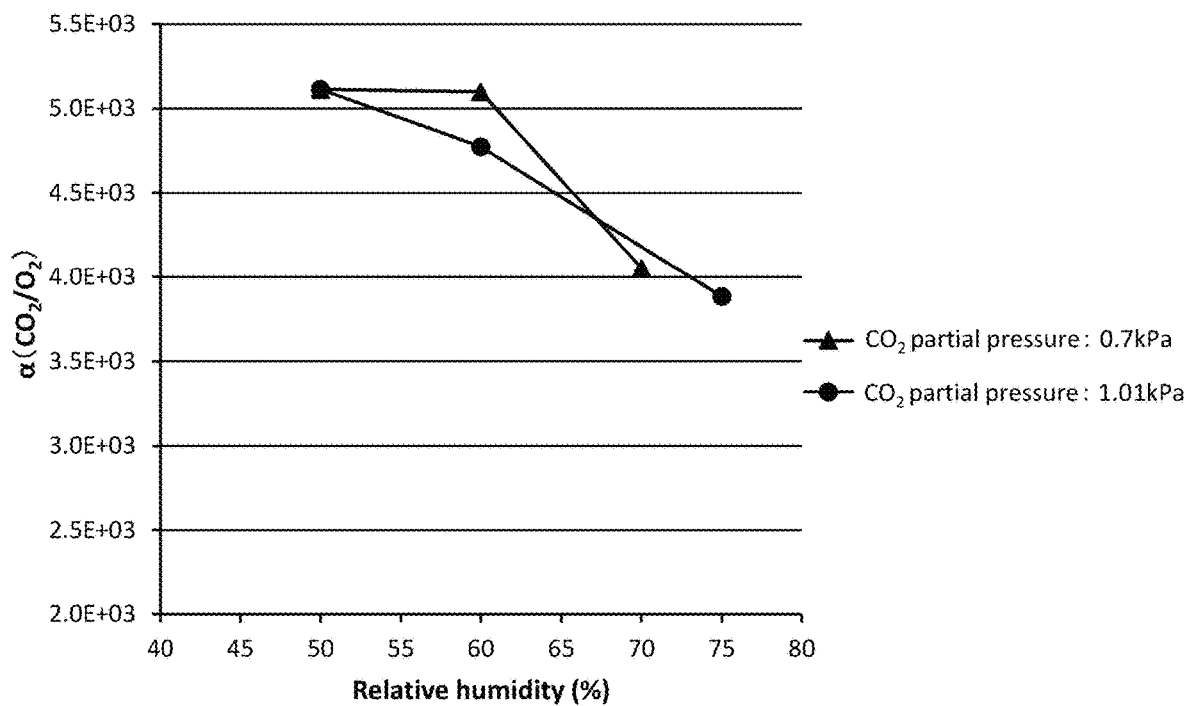

FIGS. 15A and 15B show the measured results of the membrane performances of the above three items when the $CO_2$ partial pressures are 0.7 kPa and 1.01 kPa. FIG. 15A shows the relations between $CO_2$ permeance and the relative humidity, and between $O_2$ permeance and the relative humidity in Sample #15. FIG. 15B shows the relation between $CO_2/O_2$ selectivity and the relative humidity in Sample #15.

From FIGS. 15A and 15B, regardless of the $CO_2$ partial pressure, $CO_2$ permeance and $O_2$ permeance tend to increase as the relative humidity increases, and this tendency corresponds to the result in Evaluation 4 that $CO_2$ permeance and $O_2$ permeance increase as the permeate side pressure increases. $CO_2/O_2$ selectivity tends to increase with increases in relative humidity. In Evaluation 6, the measurements have not been performed in the range of the relative humidity exceeding 75%, but regarding $CO_2/O_2$ selectivity, it is inferred that high $CO_2/O_2$ selectivity of about 1000 to 4000 can be maintained even in the range of relative humidity 75% to 100%. The point that there is no large difference when the $CO_2$ partial pressure is in between 0.7 kPa and 1.01 kPa in the measured results of the above mentioned three items of the membrane performances corresponds to the result of Evaluation 5.

[Evaluation 7]

In Evaluation 7, the effect of the processing temperature (the ambient temperature of the $CO_2$ facilitated transport membrane) on the membrane performances of the above three items was examined by the sweep gas method using the same Sample #15 as in Evaluation 6. The membrane performances of the above three items were measured at three processing temperatures of 22° C., 25° C., and 26.7° C. when the $CO_2$ partial pressure was 1.01 kPa and the relative humidity of the feed side and the permeate side was 60%.

Figure 16A:
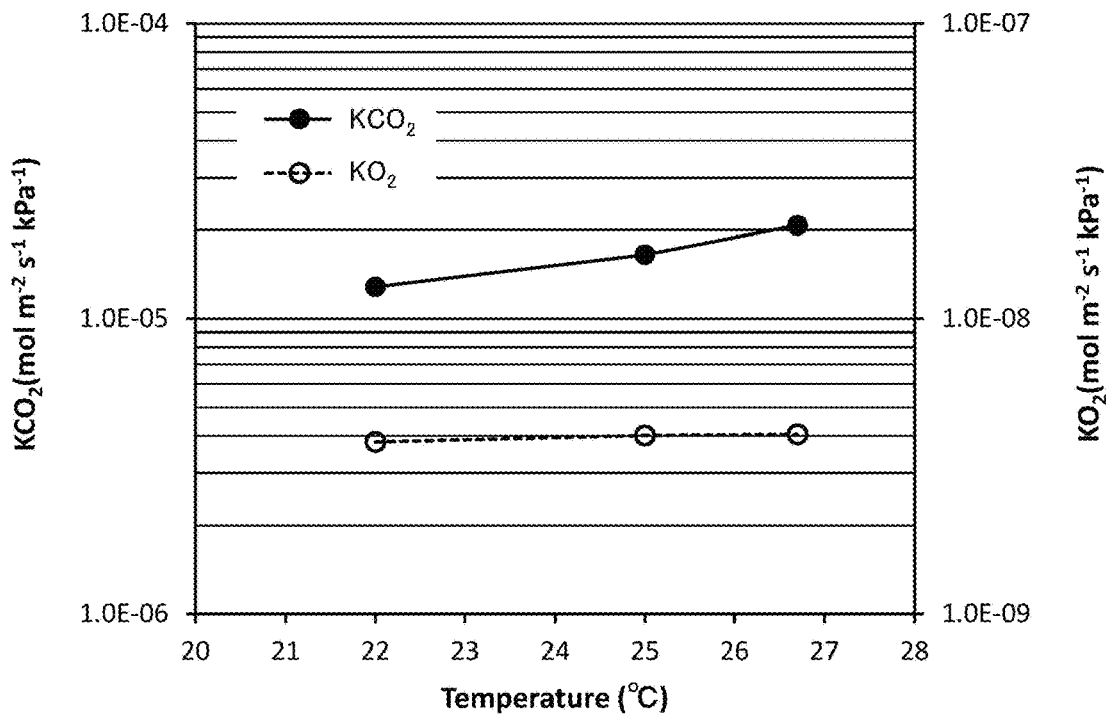
FIGS. 16A and 16B are graphs showing a relation between the membrane performances ($CO_2$ permeance, $O_2$ permeance, $CO_2/O_2$ selectivity) and a processing temperature of the $CO_2$ facilitated transport membrane (Sample #15).
Figure 16B:
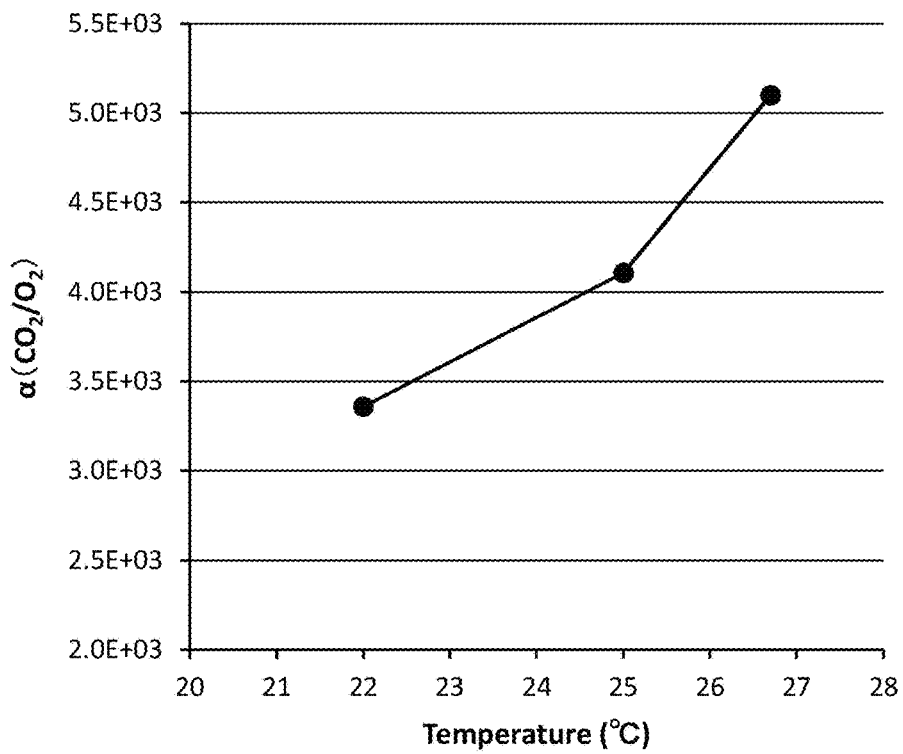

FIGS. 16A and 16B show the measurement results of the membrane performances of the above three items. FIG. 16A shows the relations between $CO_2$ permeance and the processing temperature, and between $O_2$ permeance and the processing temperature in Sample #15. FIG. 16B shows the relation between $CO_2/O_2$ selectivity and the processing temperature in Sample #15.

From FIGS. 16A and 16B, all of $CO_2$ permeance, $O_2$ permeance, and $CO_2/O_2$ selectivity tend to increase as the processing temperature increases. In the present embodiment, a temperature range of 15° C. to 50° C. is assumed as the processing temperature, but the measurements have not been performed in temperature ranges of less than 22° C. and exceeding 26.7° C. in Evaluation 7. However, for a temperature range above 26.7° C., both $CO_2$ permeance and $CO_2/O_2$ selectivity will increase as the processing temperature increases. Therefore, the membrane performances will be higher in the temperature range above 26.7° C. It is certain that the membrane performances decrease in the temperature range below 22° C., but the decreases of $CO_2$ permeance and $CO_2/O_2$ selectivity tend to slow down as the processing temperature decreases. Conversely, $O_2$ permeance decreases rapidly as the processing temperature decreases. Therefore, regarding $CO_2/O_2$ selectivity, it can be assumed that the high $CO_2/O_2$ selectivity of about 2000 to 3500 can be maintained even in the temperature range of 15° C. to 22° C.

From the evaluation results of $CO_2$ removal performance in the above Evaluations 1 to 7, it can be seen that the present method can remove $CO_2$ from the gas to be processed including $N_2$, $O_2$ and a trace amount of $CO_2$ less than or equal to 3 mol % selectively to $N_2$ and $O_2$, and reduce the carbon dioxide concentration in the gas to be processed while suppressing the $O_2$ loss.

[Valuation 8]

In the above Evaluations 1 to 7, three items of $CO_2$ permeance, $O_2$ permeance, and $CO_2/O_2$ selectivity were measured as the membrane performances of the $CO_2$ facilitated transport membrane. In Evaluation 8, $CO_2$ permeance, $N_2$ permeance, and $CO_2/N_2$ selectivity were measured using Samples #16 and #17. The measurement results of the membrane performances of the three items are shown in FIG. 17. The measurement method and the measurement conditions are the same as those in Evaluation 1. In FIG. 17, the three items are denoted as $KCO_2$, $KN_2$, and α ($CO_2/N_2$).

Sample #16 differs from Sample #1 only in that the hydrophilic polymer layer is formed on the hydrophilized PTFE porous membrane in Sample 1, whereas the hydrophilic polymer layer is formed on a hydrophobic PTFE porous membrane without using the hydrophilized PTFE porous membrane in Sample #16. The compositions and gel-weight of the hydrophilic polymer layer of Sample #16 are the same as those of Sample #1.

Sample #16 and Sample #17 differ only in that no ionic liquid is added in the hydrophilic polymer layer in Sample #16, whereas, tetramethylammonium glycine ([N1111][Gly], molecular weight: 148.2) is added as the ionic liquid in the hydrophilic polymer layer in Sample #17. Otherwise Sample #16 and Sample #17 are the same. The ionic liquid is added at 5.5 wt % based on the total weight of the hydrophilic polymer, glycine, and CsOH.

Sample #16 and Sample #17 have $CO_2/N_2$ selectivity of 5610 and 11200, indicating high selectivity performance. Although $O_2$ permeance and $CO_2/O_2$ selectivity have not been measured in Sample #16 and Sample #17, as described above, and $CO_2/O_2$ selectivity cannot simply be inferred from $CO_2/N_2$ selectivity, it is assumed that Sample #17 with the ionic liquid is higher in $CO_2/O_2$ selectivity than Sample #16 because Sample #17 with ionic liquid has a $CO_2/N_2$ selectivity about twice as high as that of Sample #16 without ionic liquid. This result is different from the results of Evaluations 2 and 3, but it is considered that the membrane performances can be improved by appropriately selecting the ionic liquid.

Hereinafter, the configuration of the present apparatus will be briefly described.

The present apparatus is an apparatus to selectively remove $CO_2$ from the gas to be processed, including $CO_2$, $N_2$ and $O_2$ using the $CO_2$ selective permeation membrane. In the present apparatus, the processing temperature range for the gas to be processed is set to be 15° C. or more, and 50° C. or less, and the $CO_2$ concentration of the gas to be processed is set to be more than 0 mol % and 3 mol % or less, preferably 2 mol % or less, more preferably 1 mol % or less, on a dry basis, in order to be adaptable to the carbon dioxide concentration control in a human residential space, in particular, in an enclosed residential space.

As described above, since the present apparatus is supposed to be adapted to the human residential space, it is required to suppress an amount of $O_2$ loss due to $CO_2$ removal process to extremely low. Therefore, the present apparatus uses the $CO_2$ facilitated transport membrane comprising the gelled hydrophilic polymer containing the amino acid, the deprotonating agent for preventing protonation of the amino group of the amino acid, and the ionic liquid, which can exhibit high $CO_2/O_2$ selectivity for the above mentioned processing temperature range and the gas to be processed of the above mentioned $CO_2$ concentration, as the $CO_2$ selective permeation membrane. The hydrophilic polymer is supported on a porous membrane to form a membranal hydrophilic polymer layer.

The present apparatus comprises a water vapor generator for generating and supplying water vapor to the $CO_2$ facilitated transport membrane. However, the water vapor generator need not necessarily be provided as long as a water vapor concentration in the gas to be processed in the present apparatus is high enough to secure the moisture content in the membrane required for reacting $CO_2$ with the amino acid, but it is preferable to comprise the water vapor generator as a general-purpose apparatus. The water vapor generator can be composed of the bubbler provided in the evaluation apparatus by the decompression method shown in FIG. 1, or a water vapor generator or the like that generates water vapor by heating water.

Further, it is preferable that the present apparatus is configured with the pressure regulator to regulate the permeate side pressure of the $CO_2$ facilitated transport membrane into 1 kPa or more and less than a saturated water vapor pressure at the atmospheric temperature of the permeate side of the $CO_2$ facilitated transport membrane to generate a $CO_2$ partial pressure difference between the feed side and the permeate side of the $CO_2$ facilitated transport membrane by reducing the permeate side pressure lower than the feed side pressure, namely by the above-mentioned decompression method, and remove $CO_2$ in the gas to be processed by selectively passing it to the permeate side of the $CO_2$ facilitated transport membrane. The relation between the feed side pressure and the permeate side pressure of the $CO_2$ facilitated transport membrane in the decompression method is as described above in the description of the present method, and therefore a duplicated description will be omitted. The pressure regulator includes, for example, a vacuum pump and a vacuum meter provided in the evaluation apparatus by the decompression method shown in FIG. 1, and can use a configuration for controlling the vacuum pump or the like so that a measured value of the vacuum meter is within a predetermined pressure range.

Figure 2:
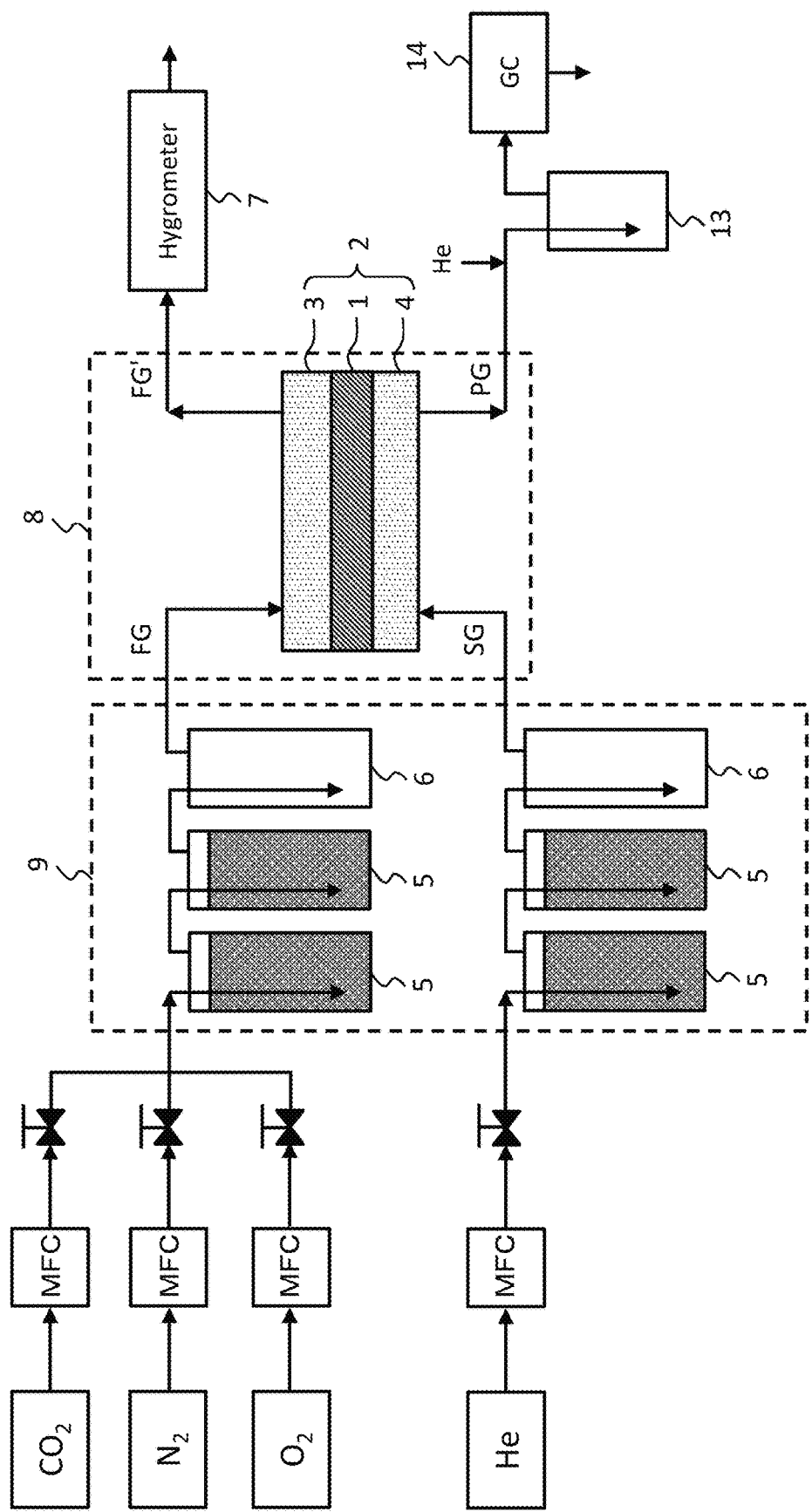
FIG. 2 is a block diagram showing an experimental apparatus for evaluating the membrane performances of the $CO_2$ facilitated transport membrane by a sweep gas method.

Alternatively, the present apparatus can be configured to use the sweep gas method instead of the decompression method to generate a $CO_2$ partial pressure difference between the feed side and the permeate side of the $CO_2$ facilitated transport membrane and to remove $CO_2$ in the gas to be processed by selectively passing it to the permeate side. In the configuration by the sweep gas method, a sweep gas supplying mechanism as exemplified in FIG. 2 is required to supply the sweep gas to the permeate side of the $CO_2$ facilitated transport membrane, instead of the pressure regulator configured by the decompression method. Further, the present apparatus may be configured by combining a decompression method and a sweep gas method.

The structures and manufacturing method of the $CO_2$ facilitated transport membrane used in the present apparatus are as described above in the description of the $CO_2$ facilitated transport membrane used in the present method, and therefore, duplicate description thereof will be omitted.

Hereinafter, another embodiment of the present method and apparatus will be described. In the present method, the permeated gas containing $CO_2$ permeated through $CO_2$ selective permeation membrane may be discarded outside the system in which the permeated gas is not mixed with the gas to be processed in the present apparatus, or may be supplied to the next process. As the next processes, $CO_2$ reduction process, $CO_2$ immobilizing process, and the like are cited. In the $CO_2$ reduction process, by supplying the permeated gas to $CO_2$ reduction catalyst, water can be generated by reduction reaction from $CO_2$ contained in the permeated gas by $CO_2$ reduction catalyst. Further, in the $CO_2$ immobilizing process, by supplying the permeated gas to a medium capable of storing $CO_2$ such as a $CO_2$ absorption liquid or a $CO_2$ adsorbent, $CO_2$ included in the permeated gas can be immobilized by actions such as chemical absorption, chemical adsorption, physical adsorption, and the like. When the present method is combined with the next process described above, the decompression method in which the permeated gas containing $CO_2$ permeated through the $CO_2$ selective permeation membrane is not mixed with a gas other than the permeated gas (sweep gas) is preferable. As a result, since the $CO_2$ concentration of the permeated gas containing $CO_2$ permeated through the $CO_2$ selective permeation membrane is higher than that of the gas to be processed, increase of the efficiency of the above reduction reaction, chemical absorption, chemical adsorption, and physical adsorption.

Figure 18:
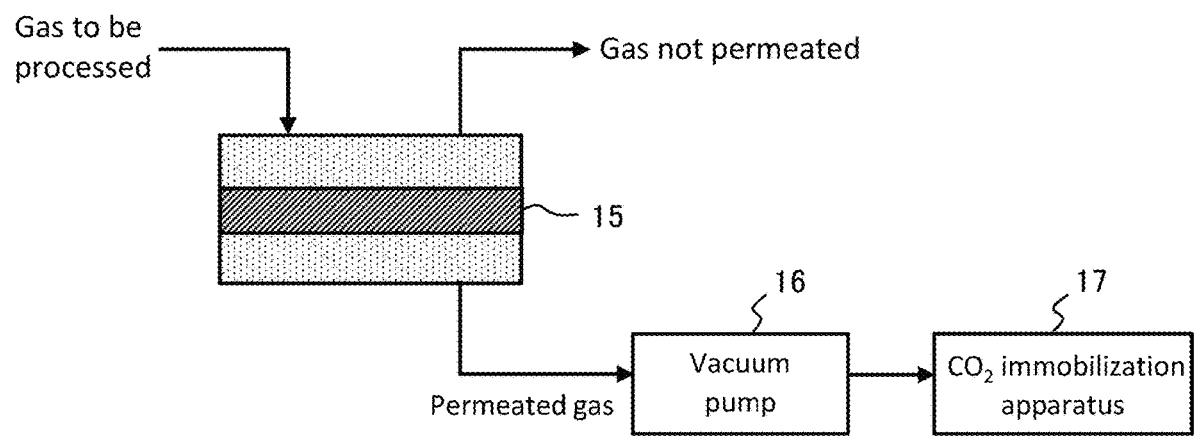
FIG. 18 is a block diagram schematically illustrating an exemplary configuration of an apparatus combining a decompression method using a $CO_2$ selective permeation membrane and a $CO_2$ immobilizing process.

As a specific example of the apparatus in which the present method by the decompression method and $CO_2$ immobilizing process are combined, there is an expanded configuration of the present apparatus shown in FIG. 18. As shown in FIG. 18, the apparatus includes the $CO_2$ selective permeation membrane 15, a vacuum pump 16 for regulating the permeate side pressure of the $CO_2$ selective permeation membrane 15 to the degree of decompression at which the $CO_2$ selective permeation membrane 15 exhibits a predetermined $CO_2$ removing capability, and a $CO_2$ immobilization apparatus 17 coupled downstream of the vacuum pump 16 for immobilizing $CO_2$ contained in the permeated gas permeated through the $CO_2$ selective permeation membrane 15. Since the pressure at the discharge side of the vacuum pump 16 when the vacuum pump 16 is operating is substantially atmospheric pressure, the permeated gas containing $CO_2$ permeated through the $CO_2$ selective permeation membrane 15 is substantially at atmospheric pressure by passing through the vacuum pump 16, and the $CO_2$ partial pressure of the permeate gas becomes higher than that of the gas to be processed. Preferably, the $CO_2$ immobilization apparatus 17 is provided with a medium capable of occluding $CO_2$ disposed in a container whose volume can be varied so that the pressure can maintain substantially the atmospheric pressure in accordance with the displacement of vacuum pump 16. Incidentally, in FIG. 18, if the medium capable of occluding $CO_2$ disposed in the container of the $CO_2$ immobilization apparatus 17 is replaced with the $CO_2$ reduction catalyst, the present apparatus can have an expanded configuration by combining the present method by the decompression method and the $CO_2$ reduction process.

INDUSTRIAL APPLICABILITY

The present invention is available for a method and an apparatus for removing $CO_2$ from a gas to be processed containing $N_2$, $O_2$ and a trace of $CO_2$ selectively to $N_2$ and $O_2$, and in particular, for a method and an apparatus for removing $CO_2$ to selectively reduce the carbon dioxide concentration while suppressing the decrease of the oxygen concentration in a human residential space.

DESCRIPTION OF SYMBOLS

1: $CO_2$ facilitated transport membrane
2: gas permeation cell
3: feed side chamber
4: permeate side chamber 5: bubbler
6: demister
7: hygrometer
8, 9: thermostatic water tank
10: needle valve
11: vacuum pump
12: vacuum meter
13: cold trap
14: gas chromatograph
15: $CO_2$ selective permeation membrane
16: vacuum pump
17: $CO_2$ immobilization apparatus

The invention claimed is:

1. A method for removing $CO_2$ comprising:
supplying a gas to be processed including $CO_2$, $N_2$ and $O_2$ to a feed side of a $CO_2$ selective permeation membrane;
generating water vapor and supplying the water vapor to the $CO_2$ selective permeation membrane;
selectively removing $CO_2$ from the gas to be processed by permeating $CO_2$ in the gas to be processed from the feed side to a permeate side of the $CO_2$ selective permeation membrane selectively to $O_2$ and $N_2$ in the gas to be processed; and
using a $CO_2$ facilitated transport membrane having $CO_2/O_2$ selectivity and $CO_2/N_2$ selectivity as the $CO_2$ selective permeation membrane, the $CO_2$ facilitated transport membrane being configured to have a hydrophilic polymer layer containing an amino acid and a deprotonating agent for preventing protonation of an amino group of the amino acid, and a porous membrane supporting the hydrophilic polymer layer,
wherein a $CO_2$ concentration of the gas to be processed is 3 mol % or less on a dry basis, and
wherein a weight of the hydrophilic polymer layer containing the amino acid and the deprotonating agent per unit area of the $CO_2$ facilitated transport membrane is equal to or more than 1 mg/cm$^2$ and equal to or less than 100 mg/cm$^2$.

2. The method for removing $CO_2$ according to claim 1, wherein the $CO_2$ facilitated transport membrane has $CO_2/O_2$ selectivity and $CO_2/N_2$ selectivity within a temperature range of 15° C. to 50° C., and the gas to be processed is supplied to the feed side of the $CO_2$ selective permeation membrane within the temperature range.

3. The method for removing $CO_2$ according to claim 1, comprising reducing a permeate side pressure of the $CO_2$ selective permeation membrane to 1 kPa or more and less than a saturated water vapor pressure at an atmosphere temperature of the $CO_2$ selective permeation membrane to be lower than a feed side pressure of the $CO_2$ selective permeation membrane.

4. The method for removing $CO_2$ according to claim 1, wherein the amino acid is at least one selected from glycine, 2,3-diaminopropionic acid, alanine, arginine, asparagine, serine, ornithine, creatine, threonine, and 2-aminobutyric acid.

5. A method for removing $CO_2$ comprising:
supplying a gas to be processed including $CO_2$, $N_2$ and $O_2$ to a feed side of a $CO_2$ selective permeation membrane;
generating water vapor and supplying the water vapor to the $CO_2$ selective permeation membrane;
selectively removing $CO_2$ from the gas to be processed by permeating $CO_2$ in the gas to be processed from the feed side to a permeate side of the $CO_2$ selective permeation membrane selectively to $O_2$ and $N_2$ in the gas to be processed; and
using a $CO_2$ facilitated transport membrane having $CO_2/O_2$ selectivity and $CO_2/N_2$ selectivity as the $CO_2$ selective permeation membrane, the $CO_2$ facilitated transport membrane being configured to have a hydrophilic polymer layer containing an amino acid and a deprotonating agent for preventing protonation of an amino group of the amino acid, and a porous membrane supporting the hydrophilic polymer layer,
wherein a $CO_2$ concentration of the gas to be processed is 3 mol % or less on a dry basis, and
wherein a relative humidity on the feed side of the $CO_2$ selective permeation membrane is 50% or more and 100% or less.

6. A method for removing $CO_2$ comprising:
supplying a gas to be processed including $CO_2$, $N_2$ and $O_2$ to a feed side of a $CO_2$ selective permeation membrane;
generating water vapor and supplying the water vapor to the $CO_2$ selective permeation membrane;
selectively removing $CO_2$ from the gas to be processed by permeating $CO_2$ in the gas to be processed from the feed side to a permeate side of the $CO_2$ selective permeation membrane selectively to $O_2$ and $N_2$ in the gas to be processed; and
using a $CO_2$ facilitated transport membrane having $CO_2/O_2$ selectivity and $CO_2/N_2$ selectivity as the $CO_2$ selective permeation membrane, the $CO_2$ facilitated transport membrane being configured to have a hydrophilic polymer layer containing an amino acid and a deprotonating agent for preventing protonation of an amino group of the amino acid, and a porous membrane supporting the hydrophilic polymer layer,
wherein a $CO_2$ concentration of the gas to be processed is 3 mol % or less on a dry basis, and
wherein a relative humidity on the permeate side of the $CO_2$ selective permeation membrane is 50% or more and 100% or less.

7. A method for removing $CO_2$ comprising:
supplying a gas to be processed including $CO_2$, $N_2$ and $O_2$ to a feed side of a $CO_2$ selective permeation membrane;
generating water vapor and supplying the water vapor to the $CO_2$ selective permeation membrane;
selectively removing $CO_2$ from the gas to be processed by permeating $CO_2$ in the gas to be processed from the feed side to a permeate side of the $CO_2$ selective permeation membrane selectively to $O_2$ and $N_2$ in the gas to be processed; and
using a $CO_2$ facilitated transport membrane having $CO_2/O_2$ selectivity and $CO_2/N_2$ selectivity as the $CO_2$ selective permeation membrane, the $CO_2$ facilitated transport membrane being configured to have a hydrophilic polymer layer containing an amino acid and a deprotonating agent for preventing protonation of an amino group of the amino acid, and a porous membrane supporting the hydrophilic polymer layer,
wherein a $CO_2$ concentration of the gas to be processed is 3 mol % or less on a dry basis, and
wherein the $CO_2$ selective permeation membrane further comprises an ionic liquid in the hydrophilic polymer layer.

8. The method for removing $CO_2$ according to claim 7, wherein the ionic liquid is an amino acid ionic liquid having an amino group.

9. The method for removing $CO_2$ according to claim 7, wherein a molecular weight of the ionic liquid is 1000 or less.

10. The method for removing $CO_2$ according to claim 7, wherein a content of the ionic liquid is 20 wt % or less based on a total weight of the hydrophilic polymer, the amino acid, and the deprotonating agent contained in the hydrophilic polymer layer.

11. An apparatus for removing $CO_2$ that removes $CO_2$ in a gas to be processed including $CO_2$, $N_2$ and $O_2$ selectively to $O_2$ and $N_2$ in the gas to be processed, the apparatus comprising:
a $CO_2$ facilitated transport membrane having $CO_2/O_2$ selectivity and $CO_2/N_2$ selectivity; and
a water vapor generator that generates water vapor and supplies the water vapor to the $CO_2$ facilitated transport membrane,
wherein the $CO_2$ facilitated transport membrane is configured to have a hydrophilic polymer layer containing an amino acid, a deprotonating agent for preventing protonation of an amino group of the amino acid, and an amino acid ionic liquid having an amino group, and a porous membrane supporting the hydrophilic polymer layer.

12. The apparatus for removing $CO_2$ according to claim 11, wherein the $CO_2$ facilitated transport membrane has $CO_2/O_2$ selectivity and $CO_2/N_2$ selectivity within a temperature range of 15° C. to 50° C.

13. The apparatus for removing $CO_2$ according to claim 11, wherein the amino acid is at least one selected from glycine, 2,3-diaminopropionic acid, alanine, arginine, asparagine, serine, ornithine, creatine, threonine, and 2-aminobutyric acid.

14. The apparatus for removing $CO_2$ according to claim 11, wherein a weight of the hydrophilic polymer layer containing the amino acid, the deprotonating agent, and the amino acid ionic liquid per unit area of the $CO_2$ facilitated transport membrane is equal to or more than 1 mg/cm$^2$ and equal to or less than 100 mg/cm$^2$.

15. The apparatus for removing $CO_2$ according to claim 11, wherein a molecular weight of the ionic liquid is 1000 or less.

16. The apparatus for removing $CO_2$ according to claim 11, wherein the $CO_2$ facilitated transport membrane is used as a $CO_2$ selective permeation membrane and the apparatus further comprises a pressure regulator for regulating a permeate side pressure of the $CO_2$ selective permeation membrane to be 1 kPa or more and less than a saturated water vapor pressure at an atmosphere temperature of the $CO_2$ selective permeation membrane.

17. The apparatus for removing $CO_2$ according to claim 11, wherein a content of the ionic liquid is 20 wt % or less based on a total weight of the hydrophilic polymer, the amino acid, and the deprotonating agent contained in the hydrophilic polymer layer.

* * * * *